United States Patent
Lu et al.

(10) Patent No.: US 12,556,981 B2
(45) Date of Patent: Feb. 17, 2026

(54) COMMUNICATION METHOD FOR TERMINAL DEVICE AND NETWORK SIDE DEVICE, AND TERMINAL DEVICE

(71) Applicant: HUAWEI TECHNOLOGIES CO., LTD., Guangdong (CN)

(72) Inventors: Henghui Lu, Beijing (CN); Yuewan Lu, Shenzhen (CN); Hui Jin, Shenzhen (CN); Yongbo Zeng, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 455 days.

(21) Appl. No.: 18/005,714

(22) PCT Filed: Jul. 15, 2021

(86) PCT No.: PCT/CN2021/106513
§ 371 (c)(1),
(2) Date: Jan. 17, 2023

(87) PCT Pub. No.: WO2022/012627
PCT Pub. Date: Jan. 20, 2022

(65) Prior Publication Data
US 2023/0300689 A1   Sep. 21, 2023

(30) Foreign Application Priority Data

Jul. 17, 2020   (CN) .......................... 202010693406.8

(51) Int. Cl.
*H04W 36/00*   (2009.01)
*H04W 36/32*   (2009.01)

(52) U.S. Cl.
CPC . *H04W 36/0058* (2018.08); *H04W 36/00835* (2018.08); *H04W 36/326* (2023.05)

(58) Field of Classification Search
CPC . H04W 24/08; H04W 24/04; H04W 36/0058; H04W 36/00835; H04W 36/326;
(Continued)

(56) References Cited

U.S. PATENT DOCUMENTS

2016/0157284 A1 *   6/2016   Kim ...................... H04W 76/10
                                                            370/329
2017/0171899 A1 *   6/2017   Seo ........................ H04W 88/04
(Continued)

FOREIGN PATENT DOCUMENTS

| CN | 104754491 A | 7/2015 |
| WO | 2012171225 A1 | 12/2012 |
| WO | 2017080423 A1 | 5/2017 |

OTHER PUBLICATIONS

Extended European Search Report in European Appln No. 21842345.7, dated Nov. 7, 2023, 9 pages.

*Primary Examiner* — Quoc Thai N Vu
(74) *Attorney, Agent, or Firm* — Fish & Richardson P.C.

(57) ABSTRACT

This application provides communication methods for a terminal device and a network side device. In an example method, a terminal device establishes a primary communication link with a network side device. The terminal device detects one or more other terminal devices, determines, from the one or more other terminal devices, one or more terminal devices as one or more coordinated communication devices, and notifies the network side device of information indicating that a coordinated communication device is used for coordinated communication. The terminal device establishes a device-to-device (D2D)-based virtual multiple-input-multiple-output (MIMO) communication connection with the coordinated communication device, to form, between the terminal device and the network side device, a coordinated communication link relayed by the coordinated communication device. The terminal device performs parallel com- (Continued)

munication with the network side device based on the primary communication link and the coordinated communication link, or performs communication based on the coordinated communication link.

20 Claims, 14 Drawing Sheets

(58) Field of Classification Search
CPC ....... H04W 4/70; H04W 76/14; H04W 76/15; H04W 88/04; H04W 76/10; H04W 8/005; H04W 4/203; H04B 7/0413; H04B 7/026; H04B 17/318; H04B 17/336; H04B 17/382; H04L 41/12; H04L 2001/0097; G01S 5/0284; G01S 2205/007
See application file for complete search history.

(56) References Cited

U.S. PATENT DOCUMENTS

| | | | |
|---|---|---|---|
| 2017/0208636 A1* | 7/2017 | Agiwal | H04W 48/10 |
| 2018/0192458 A1* | 7/2018 | Aminaka | H04W 76/14 |
| 2020/0195322 A1 | 6/2020 | Black et al. | |

* cited by examiner

COMMUNICATION METHOD FOR TERMINAL DEVICE AND NETWORK SIDE DEVICE, AND TERMINAL DEVICE

CROSS-REFERENCE TO RELATED APPLICATIONS

This application is a National Stage of International Application No. PCT/CN2021/106513, filed on Jul. 15, 2021, which claims priority to Chinese Patent Application No. 202010693406.8, filed on Jul. 17, 2020, both of which are hereby incorporated by reference in their entireties.

TECHNICAL FIELD

This application relates to the field of communication technologies, and in particular, to a communication method for a terminal device and a network side device, and a terminal device.

BACKGROUND

With rapid development of wireless communication technologies, a user has an increasingly high requirement on a transmission speed of communication. A manner that supports high-speed and large-capacity data transmission is necessary. To meet a requirement of a user on wireless data traffic, there are many wireless communication manners that support high-speed data transmission. However, in a communication manner in the conventional technology, a communication effect is affected and users communication experience is deteriorated due to factors such as poor network coverage (for example, incomplete coverage at an early stage of 5G network deployment), network congestion (for example, at sports events and concerts), large signal transmission attenuation (for example, wall penetration of a millimeter wave signal), signal interference, and the like.

SUMMARY

In view of this, this application provides a communication method for a terminal device and a network side device, and a terminal device, to resolve a problem that effective communication cannot be performed when a communication network between the terminal device and the network side device is abnormal.

Some embodiments of this application provide a communication method for a terminal device and a network side device. The following describes this application from a plurality of aspects. For implementations and beneficial effects of the following plurality of aspects, refer to each other.

According to a first aspect, this application provides a communication method for a terminal device and a network side device. The method includes: The terminal device establishes a primary communication link with the network side device; the terminal device detects one or more other terminal devices, determines, from the one or more other terminal devices, one or more terminal devices as coordinated communication devices, and notifies the network side device of information indicating that the coordinated communication device is used for coordinated communication; the terminal device establishes a device-to-device-based virtual multiple-input multiple-output communication connection with the coordinated communication device, to form, between the terminal device and the network side device, a coordinated communication link relayed by the coordinated communication device; and the terminal device performs parallel communication with the network side device based on the primary communication link and the coordinated communication link, or performs communication based on the coordinated communication link. In this application, a plurality of terminal devices in a short distance are detected, and one terminal device is selected from the plurality of terminal devices as the coordinated communication device, to assist communication between the terminal device and the network side device. Further, when the primary communication link cannot perform communication, communication data may be transmitted through the coordinated communication link.

In an embodiment of the first aspect of this application, that the terminal device detects one or more other terminal devices includes: The terminal device detects that the primary communication link is abnormal, and starts to detect another terminal device. In other words, when the terminal device has a communication abnormality, the terminal device starts to detect another terminal device to search for a coordinated communication device. Further, the coordinated communication device assists the terminal device in resolving the communication abnormality problem.

In an embodiment of the first aspect of this application, that the terminal device determines that the primary communication link is abnormal includes: When the terminal device detects that a strength value of a signal received by the terminal device is less than or equal to a preset threshold, the terminal device determines that the primary communication link is abnormal; when the terminal device detects that a signal-to-noise ratio of a signal received by the terminal device is less than or equal to a preset threshold, the terminal device determines that the primary communication link is abnormal; or when the terminal device detects that a speed of network transmission between the terminal device and the network side device is less than or equal to a preset speed, the terminal device determines that the primary communication link is abnormal. This determining manner is simple, and can effectively determine that communication between the terminal device and the network side device is abnormal.

In an embodiment of the first aspect of this application, the terminal device detects the one or more other terminal devices based on a short-distance measurement technology. Short-distance detection may not require support of an external network, does not depend on a network, and can quickly find a peripheral device.

In an embodiment of the first aspect of this application, the determining one or more other terminal devices as coordinated communication devices includes: The terminal device measures at least a distance between the terminal device and each of the other terminal devices, and selects one or more other terminal devices with a shortest distance or within a preset distance as coordinated communication devices. An effective connection between the terminal device and the coordinated communication device can be effectively ensured by limiting the distance.

In an embodiment of the first aspect of this application, the determining one or more other terminal devices as coordinated communication devices includes: The terminal device measures at least an angle of rotation from a direction that a signal receive end of the terminal device faces to a direction toward each of the other terminal devices, and selects one or more other terminal devices with a smallest angle or meeting a preset angle as coordinated communication devices. In this method, a terminal device used for coordination is determined based on an orientation of a receive end of a mobile phone. A user only needs to rotate the mobile phone and direct a signal receive end to the terminal device, to determine a desired coordinated communication device. A more convenient and flexible user operation is achieved.

In an embodiment of the first aspect of this application, the determining one or more other terminal devices as coordinated communication devices includes: The terminal device obtains signal information of the other terminal devices, where the signal information includes a strength value or a signal-to-noise ratio of a signal received by the other terminal devices, and selects a terminal device whose signal strength value or signal-to-noise ratio value is the largest as a coordinated communication device, or selects one or more other terminal devices whose signal strength values or signal-to-noise ratio values meet a preset value as coordinated communication devices. The coordinated communication device is determined based on the strength value and the signal-to-noise ratio of the signal, to ensure that a coordinated communication device with a better signal is determined, so as to ensure that the coordinated communication device can effectively assist in data transmission.

In an embodiment of the first aspect of this application, the terminal device measures a distance between the terminal device and each of the other terminal devices, measures an angle of rotation from a direction that a signal receive end of the terminal device faces to a direction toward each of the other terminal devices, and obtains signal information of the other terminal devices, where the signal information includes a strength value or a signal-to-noise ratio of a signal received by the other terminal devices; and the terminal device determines, based on the distance, the angle, and the signal information, one or more other terminal devices as coordinated communication devices. A plurality of factors are considered, so that the terminal device finds a coordinated communication device with optimal communication performance.

In an embodiment of the first aspect of this application, the terminal device performs priority sorting on the other terminal devices based on the distance, the angle, and the signal information, and determines one or more other terminal devices as coordinated communication devices. A manner of priority sorting makes it convenient for the terminal device to find an optimal coordinated communication terminal within limited resources.

In an embodiment of the first aspect of this application, the terminal sets weight values for the distance, the angle, and the signal information separately, performs weighted summation on the distance, the angle, and the signal strength value or performs weighted summation on the distance, the angle, and the signal-to-noise ratio, and then determines one or more other terminal devices with a highest score or meeting a specified value as coordinated communication devices. This facilitates the selection of an optimal coordinated communication device.

In an embodiment of the first aspect of this application, the determining one or more other terminal devices as coordinated communication devices includes: The terminal device receives a user input to designate one or more other terminal devices as coordinated communication devices. The user may select the coordinated communication device based on a requirement of the user, and this improves interaction experience of the user.

In an embodiment of the first aspect of this application, the terminal device sends communication data to or receives communication data from the network side device, where the communication data is divided into first data and second data for transmission, the first data is transmitted through the primary communication link, and the second data is transmitted through the coordinated communication link. In a manner of divided transmission, two links can simultaneously transmit data, to improve communication efficiency.

In an embodiment of the first aspect of this application, that the second data is transmitted through the coordinated communication link includes: The terminal device receives, in a transmission link over which the terminal device receives data from the network side device, a transmitted direction-finding signal generated by the coordinated communication device, and determines an angle of arrival when the direction-finding signal arrives at the terminal device; the terminal device sends the angle of arrival to the coordinated communication device, so that the coordinated communication device directs a beam of an antenna array toward the terminal device based on the angle of arrival and establishes a device-to-device-based virtual multiple-input multiple-output communication connection to the terminal device; and the terminal device receives the second data from the network side device based on the device-to-device virtual multiple-input multiple-output communication connection. This method can implement effective connection and communication between the terminal device and the coordinated communication device.

In an embodiment of the first aspect of this application, that the second data is transmitted through the coordinated communication link includes: The terminal device receives, in a link over which the terminal device sends data to the network side device, a transmitted direction-finding signal generated by the coordinated communication device, and obtains, based on the direction-finding signal, an angle of departure when the direction-finding signal leaves the coordinated communication device; the terminal device directs, based on the angle of departure, a beam of an antenna array toward the coordinated communication device, and establishes a device-to-device-based virtual multiple-input multiple-output communication connection to the coordinated communication device; and the terminal device sends the second data to the network side device based on the device-to-device virtual multiple-input multiple-output communication connection. This method can implement effective connection and communication between the terminal device and the coordinated communication device.

According to a second aspect, this application further discloses a terminal device, including:
 a memory, configured to store instructions executed by one or more processors on the device; and
 the processor, configured to perform the method according to embodiments of the first aspect.

According to a third aspect, this application further includes a system, where the system includes a terminal device and a network side device. The terminal device includes:
 a memory, configured to store instructions executed by one or more processors on the device; and
 the processor, configured to perform the method according to embodiments of the first aspect.

According to a fourth aspect, this application further includes a computer-readable storage medium, where the computer-readable storage medium stores a computer program. When the computer program is run by a processor, the processor is enabled to perform the method according to embodiments of the first aspect.

BRIEF DESCRIPTION OF DRAWINGS

FIG. 7a-1 and FIG. 7a-2 are a schematic diagram of an interface of a terminal device according to an embodiment of this application;

DESCRIPTION OF EMBODIMENTS

The following clearly and completely describes the technical solutions in embodiments of this application with reference to the accompanying drawings in embodiments of this application.

It may be understood that as used in this specification, a term "module" may be or include an application-specific integrated circuit (ASIC), an electronic circuit, a memory and/or a processor (shared, dedicated, or a group) that executes one or more software or firmware programs, combined logic circuits, and/or another appropriate hardware component that provides a described function, or may be a part of these hardware components.

It can be understood that, in embodiments of this application, the processor may be a microprocessor, a digital signal processor, a microcontroller, or the like, and/or any combination thereof. According to another aspect, the processor may be a single-core processor, a multi-core processor, or the like, and/or may be any combination thereof. It should be noted that a network side device in this application may be a base station, or may be an electronic device that performs communication by using a base station, or the like.

This is not limited herein. A coordinated communication device may be one or more other terminal devices adjacent to a terminal device of a user. The terminal device may be a terminal device that can perform wireless communication or network communication and that is disclosed in this application, for example, a mobile phone, a tablet PC, a desktop PC, a high-definition television set, a player, or a set-top box.

The following further describes embodiments of this application in detail with reference to the accompanying drawings by using communication between a mobile phone and a base station as an example.

Figure 1:
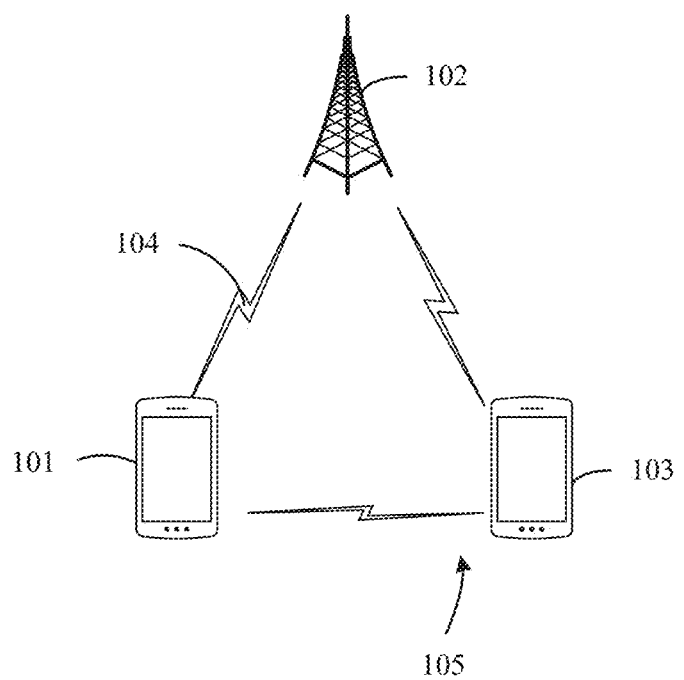
FIG. 1 is a schematic diagram of an architecture of a mobile phone and a base station in a coordinated communication system according to this application.

FIG. 1 shows an architecture of a mobile phone and a base station in a coordinated communication system. As shown in FIG. 1, in this system architecture diagram, there is a mobile phone 101 of a user, a base station 102 that communicates with the mobile phone 101, and a coordinated communication mobile phone 103. The mobile phone 101 of the user establishes a primary communication link 104 with the base station 102, the mobile phone 101 of the user establishes a coordinated communication link 105 with the coordinated communication device 103 and the base station 103. When the mobile phone 101 transmits communication data with the base station 102 based on the primary communication link 104 and the coordinated communication link 105, the communication data may be divided into two parts of data. One part of data is transmitted through the primary communication link 104, and the other part of data is transmitted through the coordinated communication link 105. When communication between the terminal device 101 and the base station 102 is abnormal, the coordinated communication mobile phone 103 may be used to assist communication between the mobile phone 101 and the base station 102, to transmit the two parts of data separately, so as to effectively improve communication efficiency between the mobile phone of the user and the base station. It should be noted that, in this application, a quantity of coordinated communication mobile phones is not limited to one, or may be greater than one. When there are a plurality of coordinated communication mobile phones, communication data may be correspondingly divided into a plurality of parts, so that each coordinated communication device separately transmits one part of communication data, to improve communication efficiency. In addition, in this application, all communication data may also be transmitted through the coordinated communication link 105, so that when the primary communication link 104 cannot perform communication, communication data transmission may be implemented through the coordinated communication link 105.

The communication data in this application is data sent by the terminal device to or received from the network side device, for example, information data when the terminal device sends an SMS message to the network side device, or a video downloaded by the terminal device from the network side device when the terminal device is used to watch the video. In a process of dividing the communication data, division may be performed based on a character length of the communication data, or division may be performed based on a type of the data. For example, when communication data corresponding to an SMS message is divided, the communication data corresponding to the SMS message may be divided into two parts of an equal character length or an unequal character length by controlling a character length, or a plurality of parts. When communication data corresponding to a video is divided, the communication data may be divided based on an image data type and an audio data type. In this way, the primary communication link and the coordinated communication link quickly transmit communication data, to improve communication reliability and a throughput of a device system.

Figure 2:
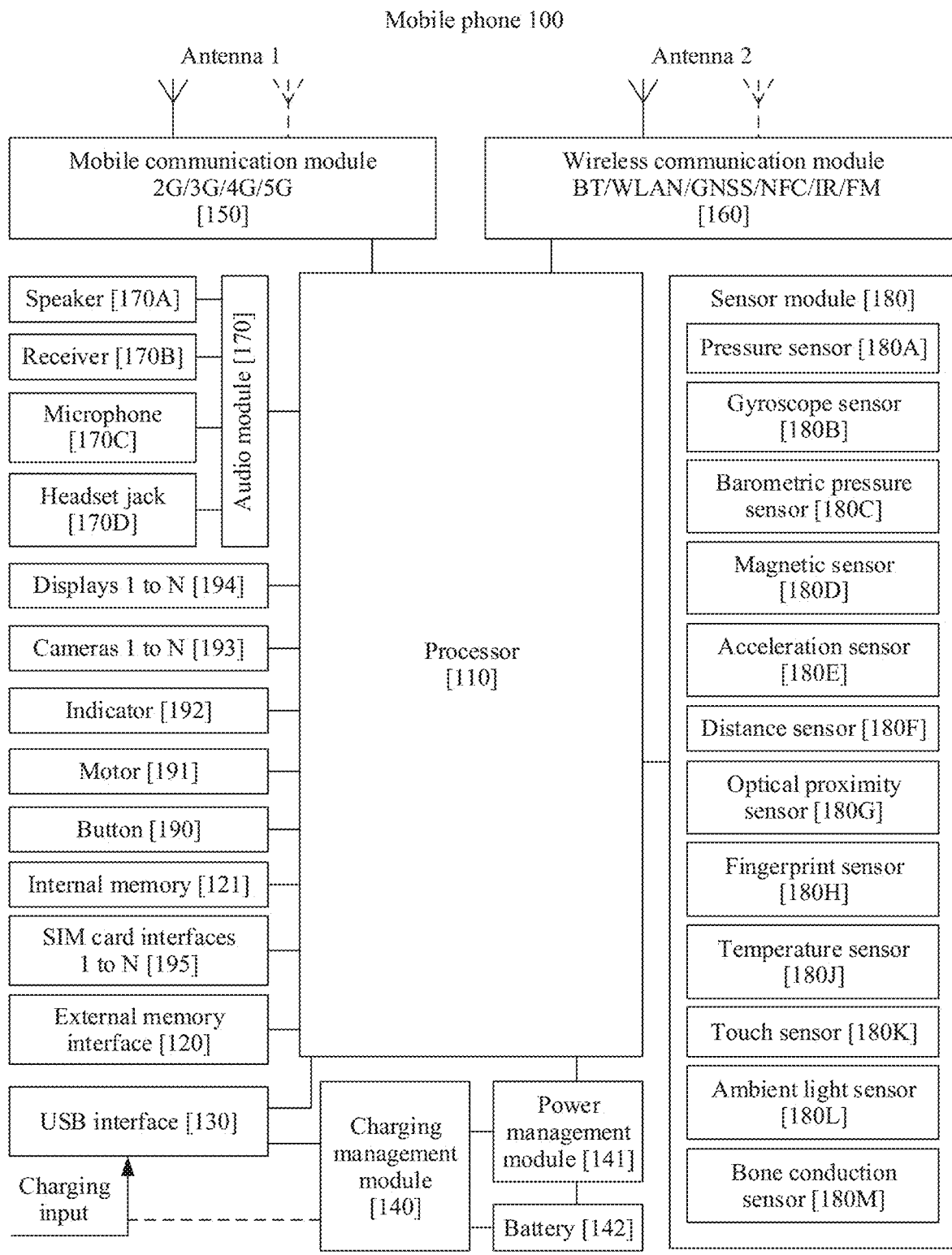
FIG. 2 is a schematic diagram of a structure of a mobile phone according to this application.

The following describes a structure and a communication process of a terminal device by using an example in which a mobile phone is used as a terminal device. FIG. 2 is a schematic diagram of a structure of a mobile phone. As shown in FIG. 2, the mobile phone 100 may include a processor 110, an external memory interface 120, an internal memory 121, a universal serial bus (universal serial bus, USB) interface 130, a charging management module 140, an antenna 1, an antenna 2, a mobile communication module 150, a wireless communication module 160, a sensor module 180, a button 190, a camera 193, and a display 194. The sensor module 180 may include a pressure sensor 180A, a gyroscope sensor 180B, a barometric pressure sensor 180C, a distance sensor 180F, a touch sensor 180K, and the like.

It may be understood that the structure shown in this embodiment of this application does not constitute a specific limitation on the mobile phone 100. In other embodiments of this application, the mobile phone 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The processor may generate an operation control signal based on instruction operation code and a time sequence signal, to complete control instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In an embodiment of this application, the processor 110 may store, by using a disposed memory, instructions used to implement a coordinated communication method according to this application. After the instructions are executed, a coordinated communication mode is enabled, and the terminal obtains, by using the wireless communication module 160, an instruction for using one or more devices as coordinated communication devices, and an instruction for controlling the mobile communication module 150 to communicate with the network side device. In the following embodiments, a process in which the processor controls, by using these instructions, the mobile communication module 150 and the wireless communication module 160 to complete coordinated communication between the mobile phone 100 and the network side device is specifically described.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be configured to perform audio communication In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the mobile phone 100. The processor 110 communicates with the display 194 through the DSI interface, to implement a display function of the mobile phone 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like The GPIO interface may alternatively be configured as an I2C interface, an I2S interface, a UART interface, an MIPI interface, or the like.

It may be understood that an interface connection relationship between the modules shown in this embodiment of this application is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

The USB interface 130 is an interface that conforms to a USB standard specification, and may be specifically a mini USB interface, a micro USB interface, a USB Type-C interface, or the like. The USB interface 130 may be configured to connect to a charger to charge the mobile phone 100, or may be configured to transmit data between the mobile phone 100 and a peripheral device, or may be configured to connect to a headset for playing audio through the headset. The interface may be further configured to connect to another electronic device such as an AR device.

A wireless communication function of the mobile phone 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the mobile phone 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same component as at least some modules of the processor 110.

The wireless communication module 160 may provide a solution to wireless communication applied to the mobile phone 100, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication. NFC) technology, and an infrared (infrared, IR) technology. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the mobile phone 100, the antenna 1 and the mobile communication module 150 are coupled, and the antenna 2 and the wireless communication module 160 are coupled, so that the mobile phone 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

In some embodiments, the wireless communication module 160 may measure a distance between the mobile phone 100 and a neighboring peripheral device by using a time of flight (Time of Flight, TOF) technology of an electromagnetic wave signal, obtain a device name of the peripheral device, and transmit an electromagnetic wave signal to and receive an electromagnetic wave signal from the peripheral device through the antenna 2, to obtain an angle of departure (Angle of Departure, AoD) and an angle of arrival (Angle of Arrival, AoA) of the signal, so as to obtain a direction in which the adjacent peripheral device is located. For example, the mobile phone 100 may obtain the distance between the mobile phone 100 and the neighboring peripheral device by measuring a distance of a Bluetooth multi-carrier phase difference, obtain the name of the peripheral device (a model of the device, a name set by a user for the mobile phone, or the like), and obtain the angle of departure when a signal is transmitted to the peripheral device and the angle of arrival when a signal is received from the peripheral device. For another example, the mobile phone 100 may obtain the distance between the mobile phone 100 and the neighboring peripheral device, and the angle of arrival and the angle of departure of a signal wave by using a short-distance wireless communication technology such as ultra wideband (Ultra Wideband, UWB). Information about the angle and the distance is transmitted by the wireless communication module 160 to the processor 110 by using the UART interface, so that the processor 110 determines, based on the angle and the distance, a device that can be used for coordinated communication, and completes a process of coordinated communication between the mobile phone 100 and the network side device.

The wireless communication module 160 may further obtain signal information of the peripheral device, where the signal information includes a strength value and a signal-to-noise ratio (Signal-to-Noise Ratio, SNR) of a signal that may be received from the peripheral device through the antenna 1.

Parameters such as a distance, an angle, and signal information in the foregoing embodiment may be transmitted by the wireless communication module 160 to the processor 110 by using the UART interface. The processor 110 determines, based on these parameters, a device that can be used for coordinated communication. The processor 110 obtains a direction of the coordinated communication device based on the angle information, generates a directional beam by adjusting a weighting coefficient of each array element in an array including the antenna 1, and directs the beam of the antenna 1 to the coordinated communication device in uplink communication, so that the antenna 1 can obtain an obvious array gain, and establish a virtual D2D (Device to Device, device to device) virtual MIMO (Multiple-Input Multiple-Output, multiple-input multiple-output) communication connection with the coordinated communication device. In this way, a process of coordinated communication between the mobile phone 100 and the network side device can be implemented.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the mobile phone 100 may include one or N displays 194, where N is a positive integer greater than 1.

The mobile phone 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV in some embodiments, the mobile phone 100 may include one or N cameras 193, where N is a positive integer greater than 1.

In some embodiments, the camera 193 may be a depth camera or an RGB camera, or may be a combination of a depth camera and an RGB camera. The camera 193 may calculate a distance between an adjacent peripheral device and the mobile phone 100 by using a stereo vision principle (stereo, MVS).

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The mobile phone 100 determines pressure strength based on the change of the capacitance. When a touch operation is performed on the display 194, the mobile phone 100 detects intensity of the touch operation by using the pressure sensor 180A. The mobile phone 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a motion posture of the mobile phone 100. In some embodiments, angular velocities of the mobile phone 100 around three axes (namely, axes x, y, and z) may be determined by using the gyroscope sensor 180B. The gyroscope sensor 180B may be configured to implement image stabilization during photographing. For example, when a shutter is pressed, the gyroscope sensor 180B detects an angle at which the mobile phone 100 jitters, calculates, based on the angle, a distance for which a lens module needs to compensate, and allows the lens to cancel the jitter of the mobile phone 100 through reverse motion, to implement image stabilization. The gyroscope sensor 180B may also be used in a navigation scenario or a somatic game scenario.

The distance sensor 180F is configured to measure a distance. The mobile phone 100 may measure a distance in an infrared or a laser manner. In some embodiments, in a photographing scenario, the mobile phone 100 may measure a distance by using the distance sensor 180F, to implement quick focusing.

The touch sensor 180K is also referred to as a "touch component". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the mobile phone 100, and is located on a position different from that of the display 194.

The display 194 or the touchscreen, as an output unit, may be configured to display adjacent peripheral devices detected by the wireless communication module 160, distances between these devices mentioned in the foregoing embodiments and the mobile phone 100, received signal information, and the like. The user may observe a status of the peripheral devices by using the display 194, and directly enter an instruction of the user by using the touch sensor 180K that is used as an input unit, so that interaction between the user and the mobile phone 100 is facilitated, and user experience is improved. To better understand this application, the following describes terms mentioned in this application.

Coordinated communication refers to a technology that uses a moving relay node to increase a capacity of a specific user. A principle of the coordinated communication is that when working frequency bands of all nodes in a cell are the same, a system may be divided into three types of nodes: a base station is a source node, a specific user (a high-speed user) is a target node, and another user terminal is a relay node. All relay nodes may be considered as transmit and receive antennas of the specific user node, so that a network is equivalent to a multiple-input multiple-output (MIMO) antenna system, which is referred to as a virtual multiple-input multiple-output (V-MIMO) antenna system and can support a specific capacity of the high-speed user.

A coordinated communication mode in this application is used to search for a coordinated communication device (relay node) that can assist a terminal device (target node) in communicating with a network side device (such as a base station), so that the terminal device and the network side device complete data transmission with each other by using the coordinated communication device.

An angle of arrival (AoA) is a measure of a direction of wave radiation propagation arriving an observation point, that is, an angle between a wave ray and a horizontal plane or a normal line of the horizontal plane.

An angle of departure (AoA) is a measure of a direction of wave radiation propagation leaving a transmitter end, that is, an angle between a wave ray and a horizontal plane or a normal line of the horizontal plane.

Both the angle of arrival (AoA) and the angle of departure (AoD) technologies are based on receivers and transmitters. The angle of arrival (AoA) is used as an example. A device with a multi-antenna linear array is used as a receiver, and another device with a single antenna is used as a transmitter. It is assumed that a radio wave is used as a plane wave instead of a spherical wave. If the transmitter that sends a sine wave is located on a normal line perpendicular to an array line, each antenna in the array receives an input signal of a same phase. If the transmitter is not located on the normal line, a receive antenna measures a phase difference between channels, and estimates an angle of arrival based on the phase difference information. When measuring an AoD, roles of a receiver and a transmitter are interchanged. The receiver uses only one single antenna, while the transmitter uses a plurality of antennas. A principle of measuring a phase difference is the same as that when measuring the angle of arrival.

A short-distance measurement technology in this application means that another device can be discovered within a specific short distance, and a short-distance wireless connection can be established to the discovered another device, or a distance between the another device and a measurement device can be obtained, for example, wireless communication technologies such as Bluetooth, Wi-Fi, ultra-wideband, and ultrasonic wave of a terminal device, and distance measurement technologies such as a depth camera or a dual-lens camera.

Figure 3:
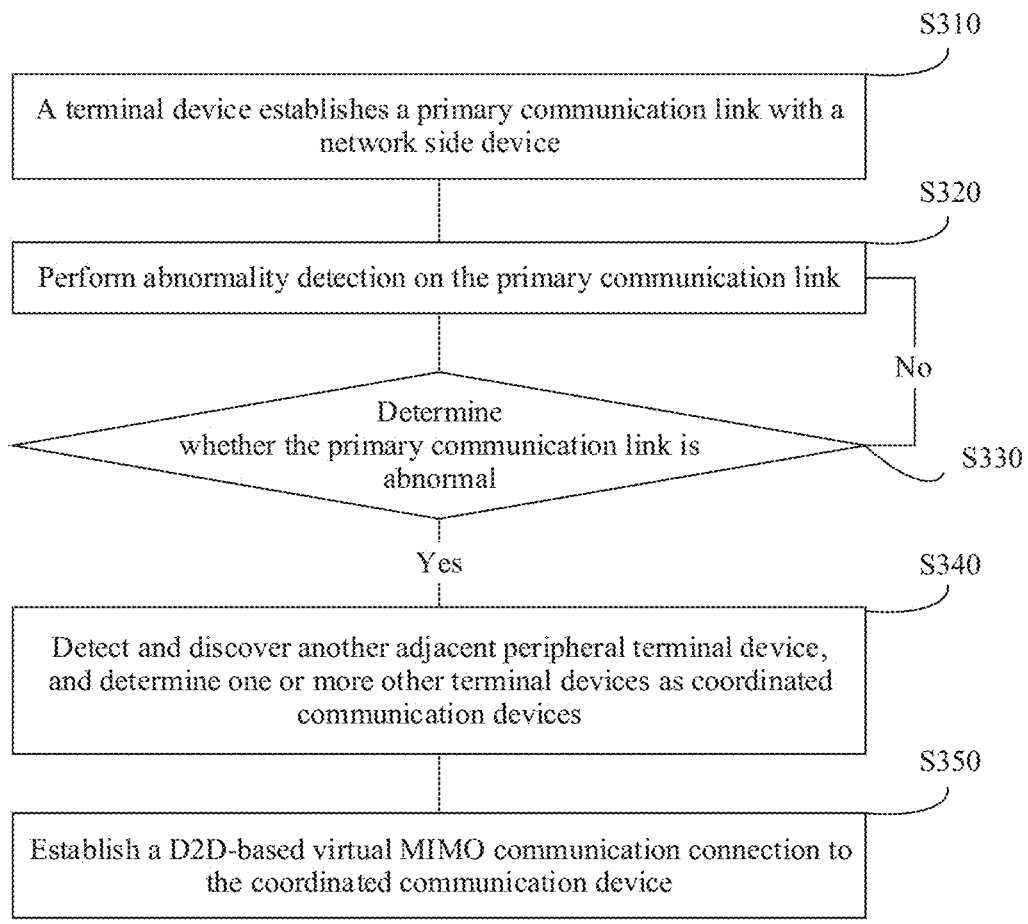
FIG. 3 is a schematic flowchart of a downlink communication method used for a terminal device and a network side device according to an embodiment of this application.

The following describes a communication process between a terminal device and a network side device by using specific embodiments. For example, the network side device is a base station. FIG. 3 is a flowchart of a communication method for a terminal device and the base station.

As shown in FIG. 3, in step 310, the terminal device establishes a primary communication link with the base station, for example, a communication link established in a process in which a user watches a high-definition video by using a mobile phone, a process in which the user has a video call with a friend, or a process in which the user receives or sends an SMS message.

In step S320, the terminal device performs abnormality detection on the primary communication link, for example, detects signal information received by the terminal device, a network transmission speed, and the like. Detection of the signal information may include detection of an information value or a signal-to-noise ratio of a signal received by the terminal device.

In step S330, the terminal device determines whether the primary communication link is abnormal. Specifically, the terminal device may determine based on the following several abnormalities. When a user watches a high-definition video by using the terminal device, frame freezing occurs on a video interface, for example, the video interface maintains a same interface within 2 seconds, that is, the terminal device detects that a download speed is equal to 0 KB/S. Alternatively, the terminal device detects that a strength value of a received signal is less than or equal to a preset threshold, for example, the strength value of the signal is less than −85 dBm. For example, when a user exercises outdoors (for example, mountaineering or hiking), a terminal device delays or fails to receive or send information. In this case, the terminal device may determine, based on the foregoing abnormality, that a primary communication link is abnormal, enable a coordinated communication mode, and perform step S340, to search for a coordinated communication device that can assist the terminal device in communicating with a network side device. If the foregoing abnormality does not occur, the terminal device continues to perform step S320. In another embodiment of this application, when the primary communication link is not abnormal, the coordinated communication mode may also be manually enabled by the user, so that the terminal device performs step S340.

In step S340, the terminal device detects and discovers another adjacent peripheral terminal device. For example, the mobile phone of the user searches for, by using Bluetooth, a plurality of adjacent mobile phones that are of friends of the user and that are paired with the mobile phone of the user, and determines, from the plurality of mobile phones of friends, one or more mobile phones as the coordinated communication device. Specifically, the terminal device detects another adjacent terminal device by using a short-distance measurement technology, for example, Bluetooth, Wi-Fi, ultra-wideband, ultrasonic wave, depth camera, or dual-lens camera of the terminal device. After the terminal device detects one or more other terminal devices, the terminal device determines, from the one or more other terminal devices, one or more terminal devices as coordinated communication devices. In addition, the terminal device notifies the network side device of information indicating that the coordinated communication device is used for coordinated communication, so that the network side device establishes a communication connection to the specified coordinated communication device.

In step 340, after the terminal device selects one or more coordinated communication devices and notifies the network side device of the corresponding one or more coordinated communication devices, the terminal device performs step 350. In other words, the terminal device notifies the network side device of information such as a communication address of the device used for coordinated communication, so that the network side device establishes a connection to the coordinated device, to implement accurate transmission of communication data. In step 350, the terminal device establishes a D2D-based virtual MIMO communication connection to the coordinated communication device, to form, between the terminal device and the network side device, a coordinated communication link relayed by the coordinated communication device, so that the terminal device performs parallel communication with the network side device based on the primary communication link and the coordinated communication link. Transmission of communication data between the terminal device and the network side device may be completed by multiplexing an antenna capability of the coordinated communication device, to enhance signal quality of the terminal device, improve a network throughput, and improve communication experience of a user.

In step 360, the terminal device receives the communication data from the base station or sends the communication data to the base station through the primary communication link and the coordinated communication link. A part of the communication data may be transmitted through the primary communication link, and the other part may be transmitted through the coordinated communication link, to improve communication efficiency of the terminal device.

With reference to the accompanying drawings, the following further describes a process of determining one or more other terminal devices as coordinated communication devices in step S340 in the communication method based on this embodiment of this application.

According to an embodiment of this application, in step 340, the terminal device may use a plurality of parameters as a criteria for selecting a mobile phone used for coordinated communication.

Figure 4:
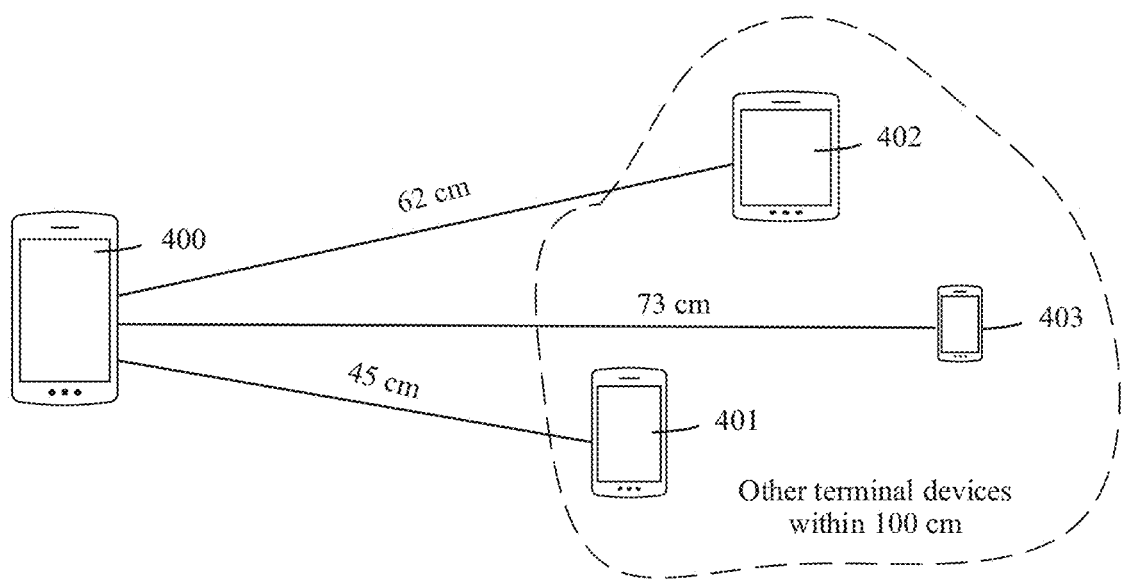
FIG. 4 is a schematic diagram of a scenario in which a terminal device determines a coordinated communication device based on a distance according to an embodiment of this application.

According to an embodiment of this application, in step 340, the terminal device may measure a distance between the terminal device and each potential peripheral terminal device used for collaboration, the terminal device may measure, based on a near field communication technology such as Wi-Fi, Bluetooth, UWB, or ultrasonic wave or an image processing technology such as a depth camera, a distance between another adjacent terminal device and the terminal device, and select one or more other terminal devices with a shortest distance or within a preset distance as coordinated communication devices. For example, as shown in FIG. 4, a terminal device 400 finds a mobile phone 401, a mobile phone 402, and a mobile phone 403 that are within 100 cm away from the terminal device 400. The terminal device 400 is 45 cm away from the mobile phone 401, 62 cm away from the mobile phone 402, and 73 cm away from the mobile phone 403. If it is set that a mobile phone within 50 cm away from the mobile phone is selected as a coordinated communication device, it is determined that the mobile phone 401 is the coordinated communication device. After determining the mobile phone used for coordinated communication, the terminal device notifies a base station of information such as a communication address of the mobile phone, so that the base station may establish a communication connection to the mobile phone 401, to receive data from the mobile phone 401 or send data to the mobile phone 401.

In this application, selecting one or more other terminal devices with a shortest distance or within a preset distance may be performed based on a current actual situation of the terminal device. Usually, the terminal device may select a device with the shortest distance as a coordinated communication device, to avoid consumption of internal resources and power of the terminal device when a plurality of mobile phones are connected, and improve reliability of a connection between the terminal device and the coordinated communication device when the device with the shortest distance is connected. When data transmitted by the terminal device is large, a plurality of terminal devices within the preset distance may be selected as coordinated communication devices, to improve a transmission speed. When there is only one device within the preset distance, the device is selected as a coordinated communication device. In addition, in this application, the coordinated communication device may also be manually selected by the user. This is not limited herein.

In another embodiment of this application, when the terminal device detects a plurality of potential terminal devices used for coordination, and if the terminal device selects based on a rule of selecting a coordinated communication device with a shortest distance or within a preset distance, but communication performance of a device that complies with the rule is weaker than communication performance of a device that does not comply with the rule, the terminal device may alternatively select a device that does not comply with the rule and that has good communication performance. For example, when the terminal device selects a device based on a rule of selecting a device with a shortest distance, if a device A with the shortest distance uses 4G for communication, but a device B whose distance is greater than a distance of only the device A uses 5G for communication, the terminal device may select the device B. A coordinated communication device with better communication performance is selected to improve efficiency of communication between the terminal device and the network side device.

Figure 5:
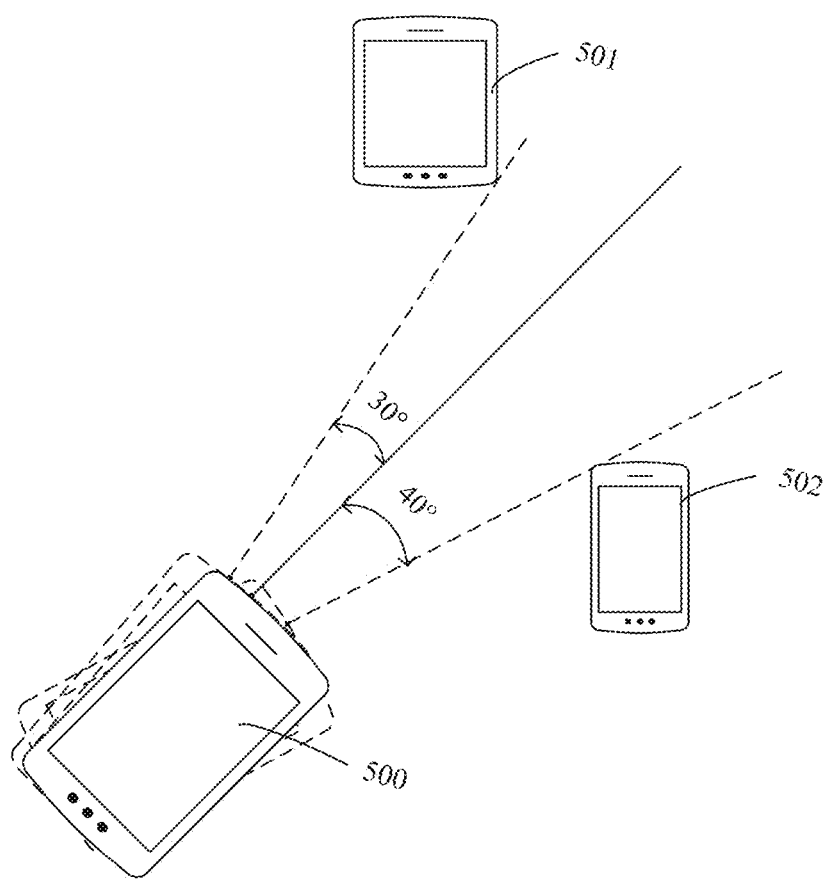
FIG. 5 is a schematic diagram of a scenario in which a terminal device determines a coordinated communication device based on an angle according to an embodiment of this application.

According to another embodiment of this application, in step 340, the terminal device may measure, by using an angle measurement sensor such as a gyroscope, an angle of rotation from a direction that a signal receive end of the terminal device faces to a direction toward each of the potential nearby devices used for coordination, and select one or more other terminal devices with a smallest angle or meeting a preset angle as coordinated communication devices. As shown in FIG. 5, angles of rotation from a direction that a signal receive end of a terminal device 500 faces to a direction toward a mobile phone 501 and a direction toward a mobile phone 502 are 30 degrees and 40 degrees respectively. According to a set requirement, a mobile phone corresponding to a smallest angle is selected as a coordinated communication device, so the mobile phone 501 is selected as the coordinated communication device. In this method, a terminal device used for coordination is determined based on an orientation of a receive end of a mobile phone. A user only needs to rotate the mobile phone and direct the signal receive end to the terminal device, to determine a desired coordinated communication device, so as to achieve a more convenient and flexible operation.

According to some embodiments of this application, in step 340, the terminal device may further receive, by using a near field communication technology such as Wi-Fi, Bluetooth, UWB, or an ultrasonic technology, a direction-finding signal sent by each peripheral terminal device, and obtain an angle of departure (AoD) when the direction-finding signal leaves the peripheral terminal device, or an angle of arrival (AoA) when the direction-finding signal arrives at the terminal device. The terminal device may select a corresponding terminal device meeting a preset angle as the coordination device. For example, a corresponding device whose angle is between 0° and 30° is selected as the coordination device. It should be noted that the angle of arrival and the angle of departure in this application may be calculated by using a method in the conventional technology, and details are not described herein.

Figure 6:
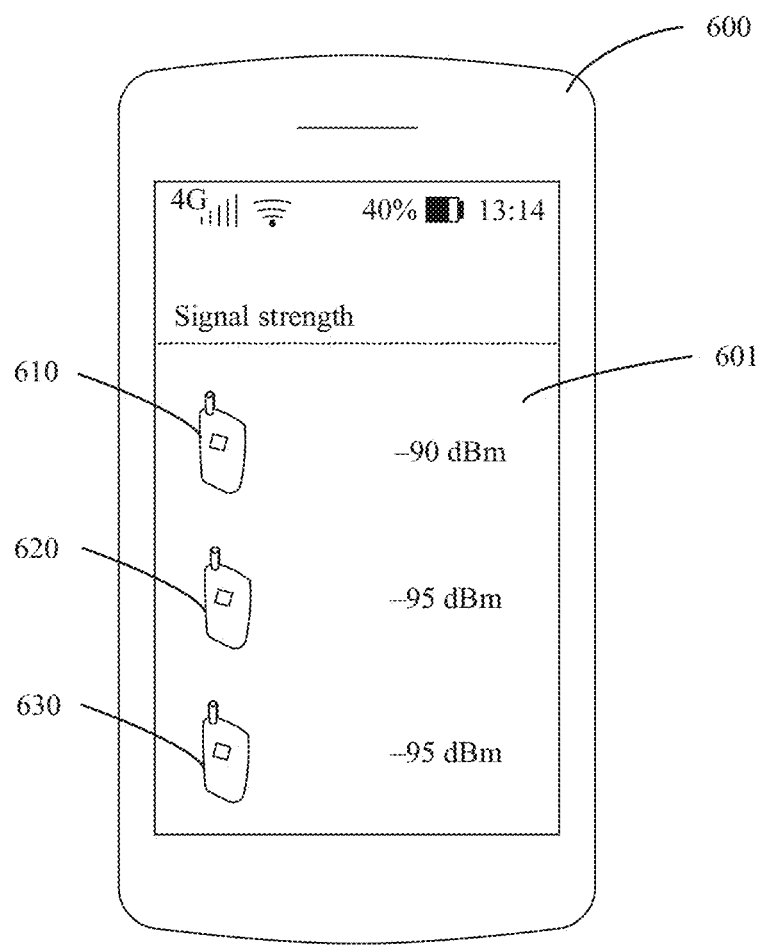
FIG. 6 is a schematic diagram of an interface displayed by a terminal device based on signal information according to an embodiment of this application.

According to some other embodiments of this application, in step 340, the terminal device may obtain, by using a near field communication technology such as Wi-Fi, Bluetooth, UWB, or an ultrasonic technology, signal information such as a strength value or a signal-to-noise ratio of a signal received by another terminal device, select a terminal device whose signal strength value or signal-to-noise ratio value is the largest as a coordinated communication device; or use one or more other terminal devices whose signal strength values or signal-to-noise ratio values meet a preset value as coordinated communication devices. For example, as shown in FIG. 6, an interface 601 of a mobile phone displays that measured strength values of signals corresponding to a mobile phone 610, a mobile phone 620, and a mobile phone 630 are respectively −90 dBm, −95 dBm. and −100 dBm. If a mobile phone whose received signal strength value is greater than a preset value −90 dBm is selected as a coordinated communication device, the mobile phone 600 may select the mobile phone 610 as the coordinated communication device. In another embodiment of this application, rules of priority sorting can be set based on an actual situation. When none of discovered devices meets a specified rule ranked first, instructions of rules may be executed one by one based on a priority sequence to select a coordinated communication device until at least one coordinated communication device is determined. For example, description is provided with reference to FIG. 6. When a set rule is that a mobile phone whose signal strength value is greater than a preset value −80 dBm is selected as a coordinated communication device, but the discovered mobile phones cannot meet a requirement of the set rule, the mobile phone 600 may directly execute another set rule, that is, the mobile phone 600 may select the mobile phone 610 whose received signal strength value is the largest as a coordinated communication device, or the mobile phone 600 arranges the devices in descending order of signal strength values, and then selects the mobile phone 610 and the mobile phone 620 that are ranked first two places as coordinated communication devices, so that at least one mobile phone in the discovered peripheral mobile phones can be obtained as a coordinated communication device.

When selecting a coordinated communication device by using the foregoing listed parameters, the terminal device may use one of a distance, an angle, a signal strength value, and a signal-to-noise ratio, or may use two or all of the parameters. The following uses a case in which all parameters are used as an example.

In an embodiment of this application, when the terminal device uses parameters such as a distance, an angle, and signal information as a criteria for selecting a coordination device, priority sorting of the three parameters are set differently. Each criteria is given its own priority. After a plurality of terminal devices that can be used for coordinated communication are discovered, the terminal devices are sorted based on the priorities, and one or more terminal devices are determined as the coordinated communication device based on the priorities. For example, when selecting the coordination device, the terminal device sets a priority sorting criteria to distance, signal strength, and angle. In this case, a closest device is preferably selected from the peripheral devices of the terminal device. If two devices have a same distance to the terminal device, a device whose signal strength is the largest is considered to be selected. The rest may be deduced by analogy to determine an optimal coordinated communication device. In addition, when a currently connected coordinated communication device is disconnected, the terminal device may reselect an optimal coordinated communication device based on the foregoing priority sorting, to ensure effective communication of the terminal device. When a plurality of coordination devices are selected, based on the foregoing priority sorting, the terminal device may preferably select a coordinated communication device whose distance meets a preset requirement. When no coordinated communication device is found within a preset required distance, a coordinated communication device whose signal strength meets a preset value is considered to be selected. The rest may be deduced by analogy. A manner of priority sorting makes it convenient for the terminal device to find an optimal coordinated communication terminal within limited resources. In addition, when a plurality of coordination devices are selected, optimal devices of each parameter of a distance, an angle, and signal information may be selected as the plurality of coordinated communication devices. For example, a plurality of optimal coordinated communication devices with a closest distance, a smallest angle, and largest signal strength value are selected, to facilitate effective data transmission. In another manner, when using parameters such as a distance, an angle, and a signal strength value as a criterion for selecting a coordination device, the terminal device may assign, based on the three parameters, a score to feasibility of using a peripheral terminal as a coordinated communication device. In addition, the terminal device assigns weight values to parameters such as a distance, an angle, and a signal strength value in the foregoing embodiment. The score of each parameter is multiplied by the weight values and then products are summed up. Alternatively, when using parameters such as a distance, an angle, and a signal-to-noise ratio of a signal as a criterion for selecting a coordination device, the terminal device assigns, based on the distance, the angle, and the signal-to-noise ratio, a score to feasibility of using a peripheral terminal as a coordinated communication device, and multiplies the score by a weight and then sums up the products, to determine one or more other terminal devices with a highest score or meeting a specified value as coordinated communication devices. For example, refer to Table 1.

TABLE 1

Scoring rule based on a distance, an angle, and a signal strength value

| Sequence number | Distance from the terminal device Weight: 0.5 | Score | Signal strength value Weight: 0.3 | Score | Angle from the terminal device Weight: 0.2 | Score |
|---|---|---|---|---|---|---|
| 1 | ≤50 cm | 10 points | ≥−60 dBm | 10 points | ≤30° | 10 points |
| 2 | 50 cm to 70 cm | 8 points | −60 dBm to −90 dBm | 8 points | 30° to 50° | 8 points |
| 3 | ≥70 cm | 5 points | ≤−90 dBm | 5 points | ≥50° | 5 points |

According to the scoring rule in Table 1, the terminal device sequentially sets weight values for parameters, to select an optimal coordinated communication device. The terminal device assigns scores to the distance value, the signal strength value, and the angle value, multiplies, by respective weights, the scores assigned to the distance, the angle, and the signal information corresponding to each of the other terminal devices, and then sums up the products, to obtain scores corresponding to the other terminal devices. A score corresponding to each of the other terminal devices is sequentially calculated based on the foregoing score calculation rule, and one or more of the other terminal devices that have a highest score or meet a specified value are determined as coordinated communication device.

It should be noted that setting of a score and a weight of each parameter mentioned in this embodiment of this application is merely an example for description. For ease of understanding of a process of determining a coordinated communication device, this is not limited herein.

Although the foregoing lists implementations in which the coordination device is determined by using at least one or all of the distance, the angle, and the signal information, a combination of any two of the foregoing parameters may be used to determine the coordination device in another implementation. This is not limited herein.

Figures 1, 7A:
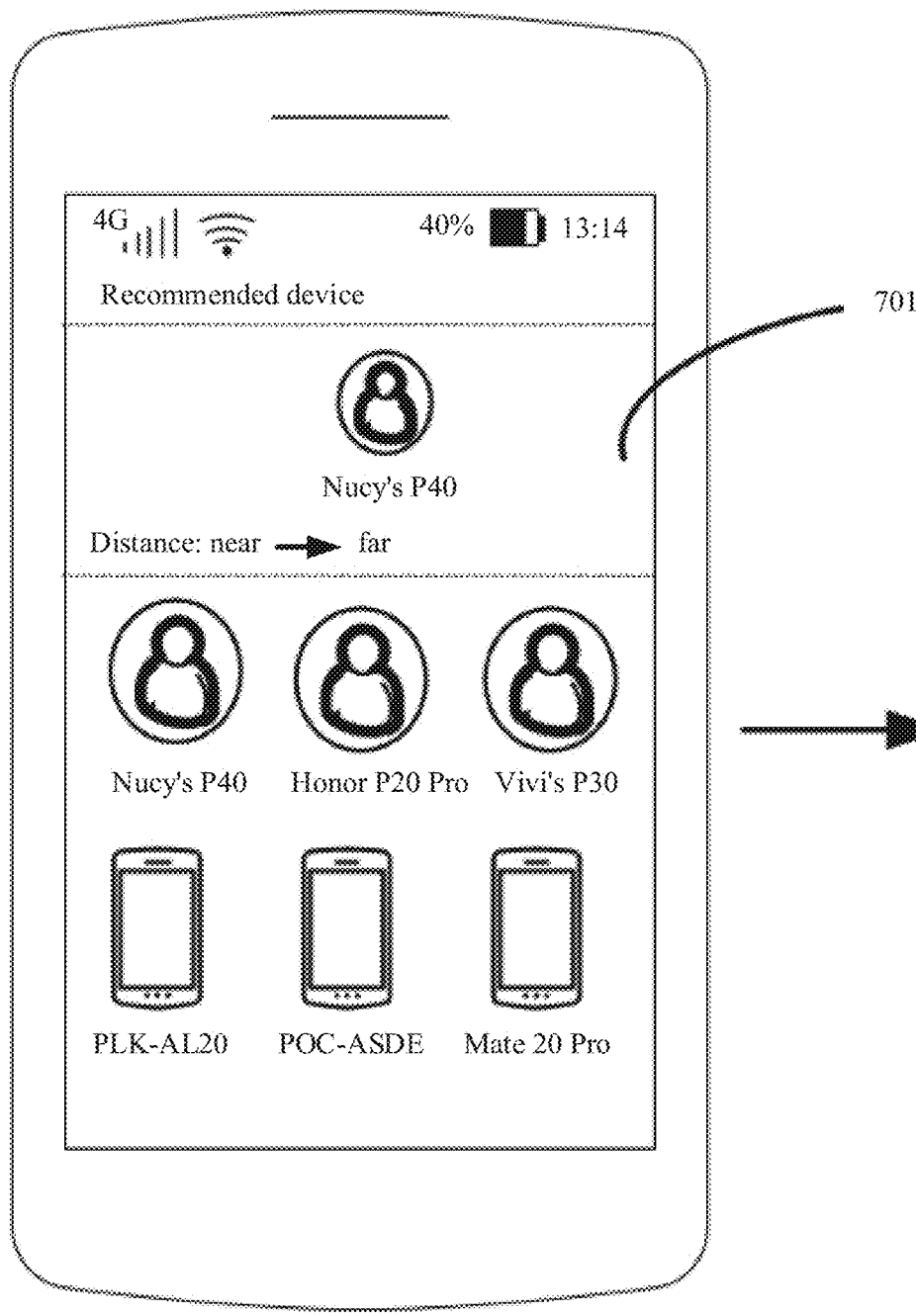
Figures 2, 7A:
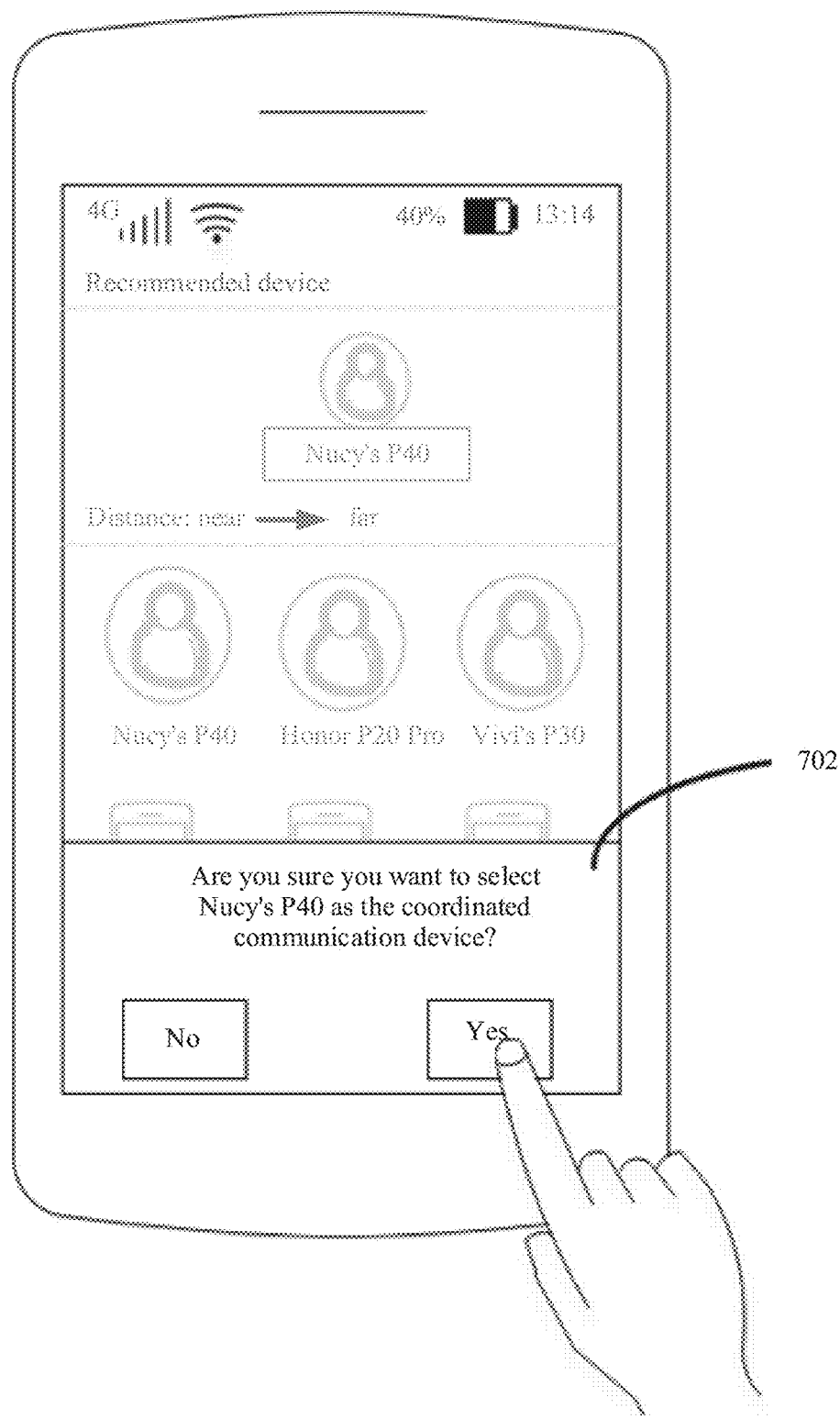

In addition, in another embodiment of this application, the terminal device receives a user input to designate one or more other terminal devices as coordinated communication devices. The terminal device may display detected peripheral devices to the user by using a specific interface. The user manually selects one or more terminal devices as coordinated communication devices based on a requirement of the user. The terminal device receives an instruction of a manually selected terminal device of the user, and executes the instruction to use one or more specified terminal devices as coordinated communication devices. The interface may be displayed in a plurality of manners. For example, icons may be arranged and displayed based on a priority sequence of parameter values. For example, icons are arranged in descending order of distances, in ascending order of angles, and in descending order of signal strength values, or icons are arranged in descending order of trust levels. For example, when icons are arranged in descending order of trust levels, and the arrangement may be performed in descending order of quantities of communication times among devices that have communicated with the terminal device of the user. A radar map may also be displayed. For example, measuring a distance between a peripheral device and the terminal device is used as an example. In an icon arrangement display diagram shown in FIG. 7a-1 and FIG. 7a-2, when the terminal device measures distances between the terminal device and peripheral terminal devices, the peripheral terminal devices may be arranged in descending order of distances. The closest device is displayed to a user on a first interface 701 of a display of a mobile phone as a recommended preferred device. As shown in FIG. 7a-1 and FIG. 7a-2, the mobile phone searches for peripheral devices by using Bluetooth, and arranges and displays, in the interface 701, detected devices in descending order of distances. The devices are Nucy's P40, Honor P20, Vivi's P30, PLK-AL20, POC-ASDE, and Mate 20 Pro in sequence. In addition, the mobile phone may recommend Nucy's P40 as a coordinated communication device based on a set rule of selecting a device whose distance is the shortest. The user may see these detected terminal devices on the interface 701. The user may directly tap to select the recommended device, that is, Nucy's P40, or may select a device that the user wants to select as the coordinated communication device. To improve reliability of selection, after the user taps a terminal device displayed on the interface 701, for example, after the user taps Nucy's P40, a second interface 702 is further displayed. An option of re-confirming the coordinated communication device is displayed, for example, "Are you sure you want to select Nucy's P40 as the coordinated communication device?". After the user taps a "Yes" option on the interface 702, it is determined that Nucy's P40 that is tapped by the user on the first interface 701 is used as the coordinated communication device, to improve interaction experience of the user.

Figure 7B:
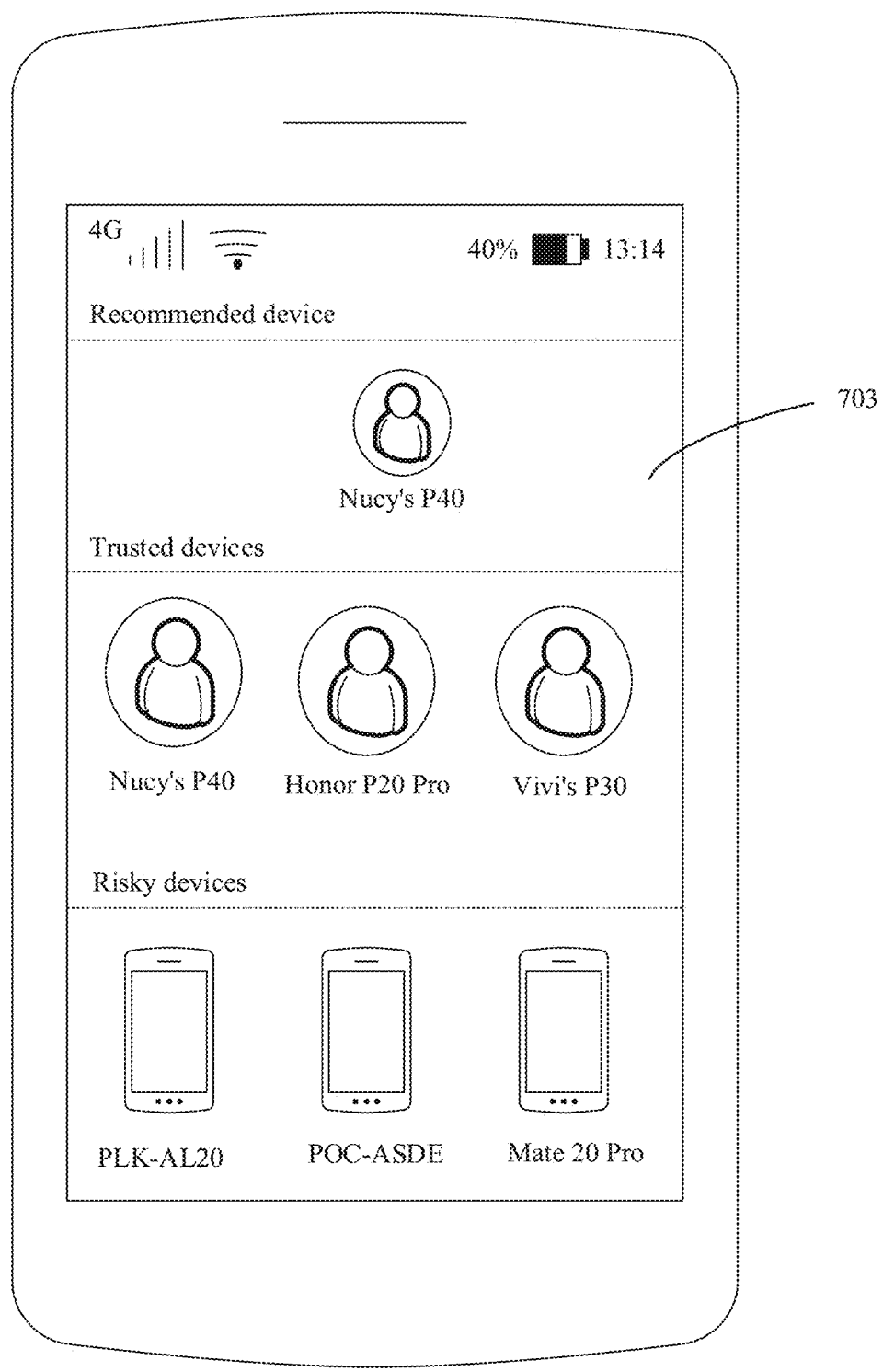
FIG. 7b is a schematic diagram of an interface of a terminal device according to an embodiment of this application.
Figure 7C:
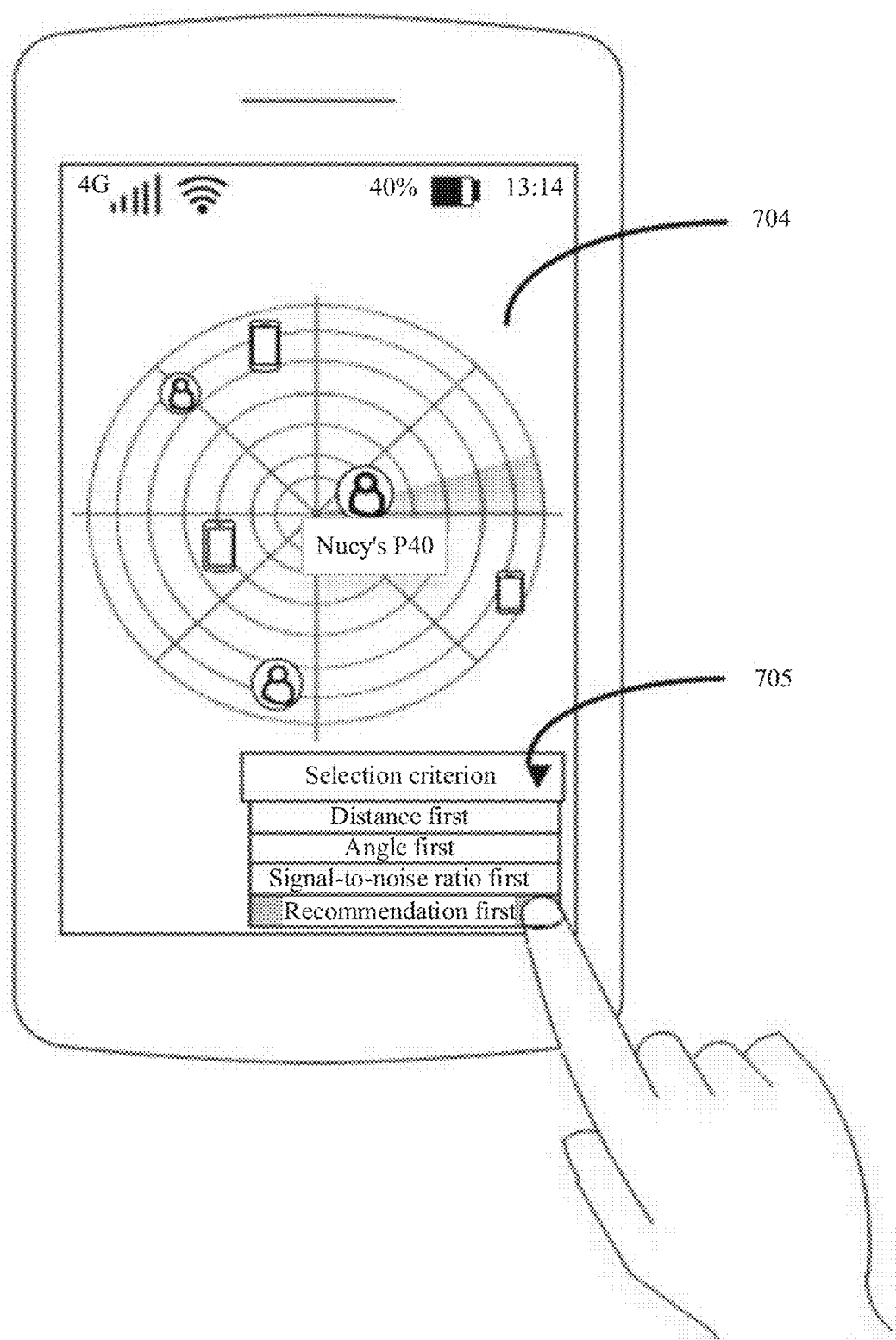
FIG. 7c is a schematic diagram of an interface of a terminal device according to an embodiment of this application.
Figure 7D:
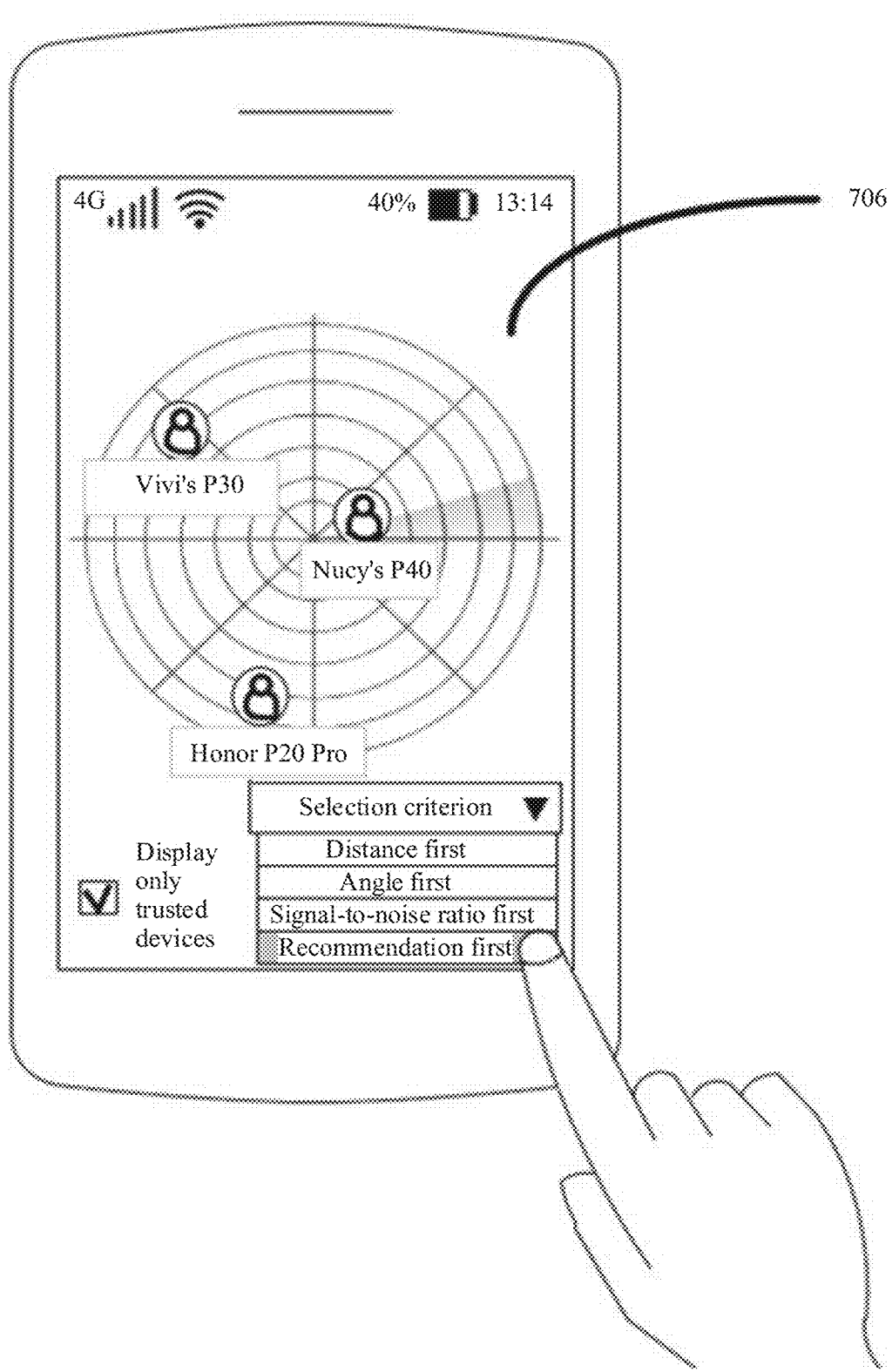
FIG. 7d is a schematic diagram of an interface of a terminal device according to an embodiment of this application.

In an arrangement diagram of trust levels shown in FIG. 7b, the terminal device may display detected peripheral devices on an interface based on the trust levels. As shown in FIG. 7b, on a third interface 703, displayed trusted devices include Nucy's P40, Honor P20, and Vivi's P30, and risky devices include PLK-AL20, POC-ASDE, and Mate 20 Pro. In addition, Nucy's P40, which has a highest trust level, is recommended to the user for direct selection. A trust level may be determined based on a quantity of times of communication between devices and the mobile phone. For example, if the mobile phone communicates with Nucy's P40 for a largest quantity of times, it is considered that Nucy's P40 is most reliable. A risky device may be determined based on that no communication is performed with the mobile phone or a quantity of communication times is less than a set quantity of times. In addition, the interface of the terminal device may be further displayed in a form of a radar map. As shown in FIG. 7c, a fourth interface 704 displays obtained adjacent peripheral devices in a form of a radar map, and the user may select a desired selection criteria by using a drop-down menu 705. As shown in FIG. 7c, the selection criteria may include: distance first, angle first, signal-to-noise ratio first, and mobile phone recommendation first. For sorting and selection of devices in each criteria, refer to descriptions about selection of distance, angle, and signal information parameters in the foregoing embodiment. When the user selects a selection manner in which recommendation is preferred, a name and a color of a recommended device are displayed differently from that of an unrecommended device. For example, the mobile phone recommends Nucy's P40 based on the recommendation-first selection manner selected by the user, and displays Nucy's P40 in the interface 704, so that the user can see the selected Nucy's P40 in the interface 704. In addition, only trusted devices may be selected based on the trust level selection manner. As shown in FIG. 7*d*, in a fifth interface 706, when the user selects an option of displaying only trusted devices, devices of all trusted users are displayed, for example, the interface 706 displays only several trusted devices, such as Nucy's P40, Vivi's P30, and Honor P20, to improve user communication security.

It should be noted that the display manner of the interface described in this application is merely an example for description, and another form may also be used, for example, a pie chart, a column chart, or a linear chart, to display each parameter value and a device name corresponding to the parameter value. This is not limited herein.

Figure 7E:
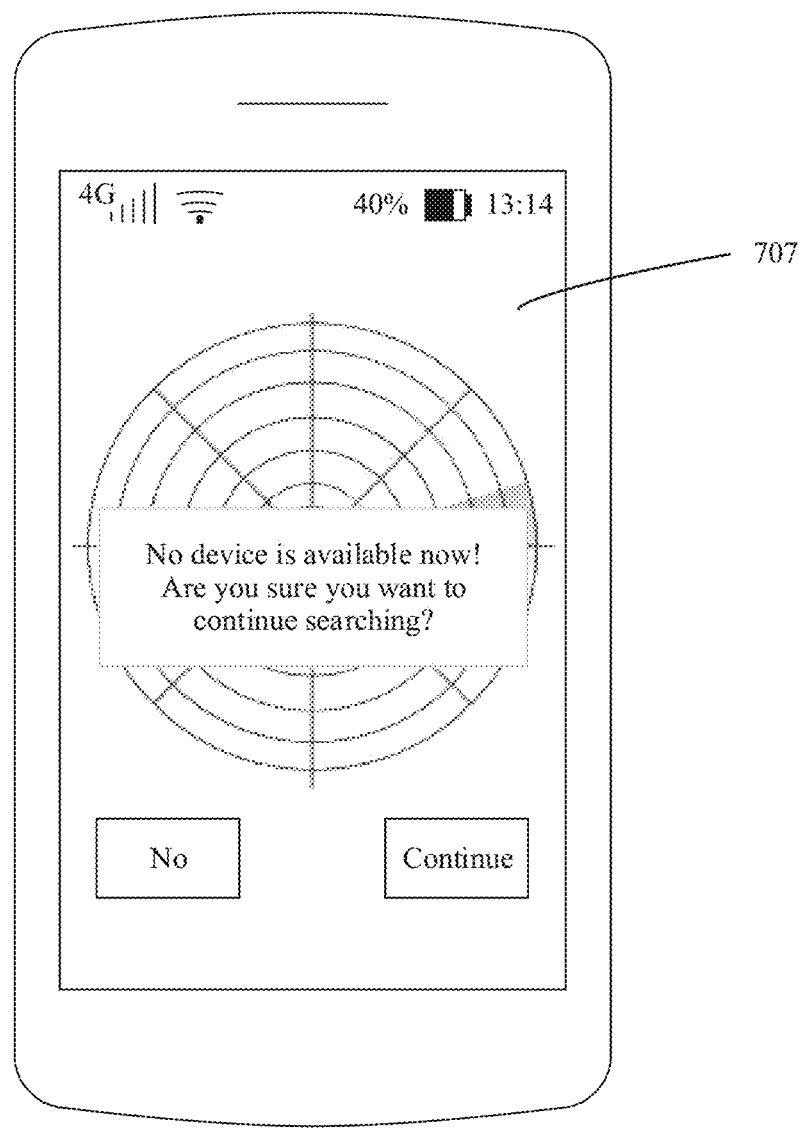
FIG. 7e is a schematic diagram of an interface of a terminal device according to an embodiment of this application.

In this embodiment of this application, when the terminal device does not find an adjacent peripheral device by using a near field detection technology, the terminal device may notify, in an interface display manner or a voice broadcast manner, the user that no potential communication device used for coordinated communication is found. As shown in FIG. 7*e*, when the terminal device does not find an adjacent peripheral device used for coordinated communication, a sixth interface 707 is displayed with texts of "No device is available!". In addition, an option of whether to continue searching is displayed, so that the user can choose whether to continue searching for peripheral devices. In this way, the user can learn about surrounding conditions in a timely manner, to improve user experience.

With reference to the architecture diagram of the coordinated communication system shown in FIG. 1, the following describes in detail the establishment of the coordinated communication link in step S350 and the communication data transmission processes of uplink communication and downlink communication of the primary communication link and the coordinated communication link in step S360 in FIG. 3.

Figure 8:
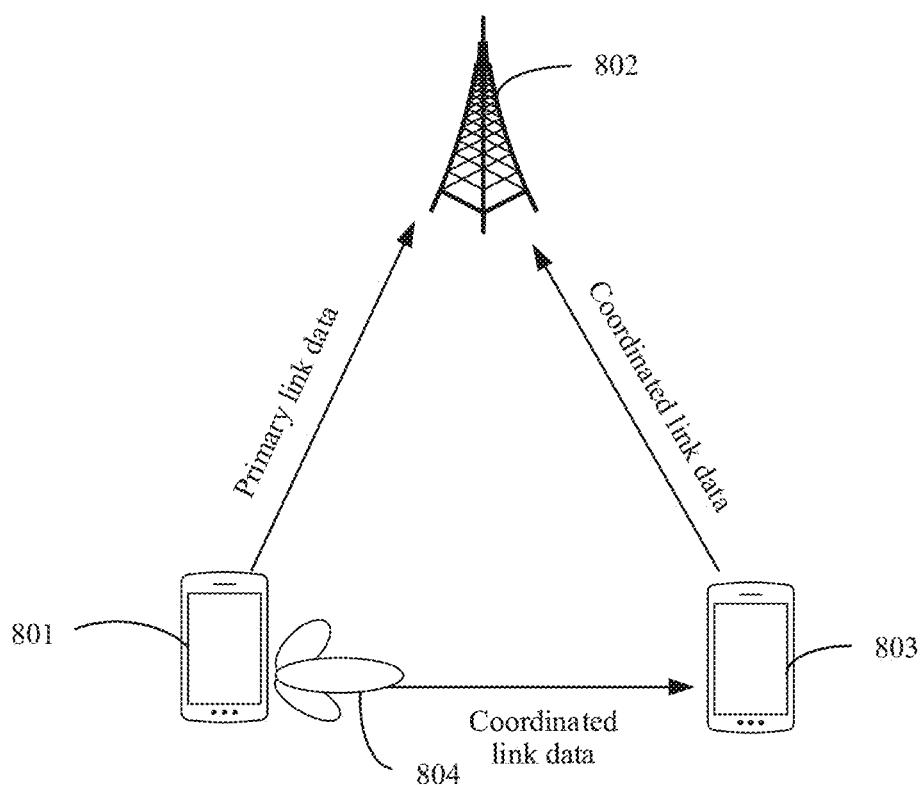
FIG. 8 is a schematic diagram of a structure of uplink communication in a coordinated communication system according to an embodiment of this application.

FIG. 8 is a schematic diagram of a structure of uplink communication in the coordinated communication system in FIG. 1. As shown in FIG. 8, a terminal device 801 sends communication data to a base station 802 through a primary communication link. Step S350 is first described. When the terminal device 801 finds that the primary communication link is abnormal, the terminal device 801 searches for and determines a coordinated communication device. The terminal device 801 receives a direction-finding signal generated and transmitted by a coordinated communication device 803, and obtains an angle of arrival at which the direction-finding signal arrives at the terminal device. Then the terminal device 801 directs a beam 804 of an antenna array toward the coordinated communication device 803 based on the angle of arrival, to obtain a high antenna gain, and establish a D2D-based virtual MIMO communication connection to the coordinated communication device 803. In step 360, the terminal device may divide the communication data into primary link data and coordinated link data. The primary link data and the coordinated link data are different data, and the primary link data and the coordinated link data are combined to form complete communication data. A manner of dividing the data is described in detail in the foregoing embodiment, and details are not described herein again. The terminal device 801 sends the coordinated link data to the coordinated communication device 803 based on the D2D virtual MIMO communication connection in step S350, and the coordinated communication device 803 transmits the coordinated link data to the base station 802. The terminal device 801 directly transmits the primary link data to the base station 802. The base station receives the primary link data and the coordinated link data, to complete a data transmission process of uplink communication.

For example, when a user sends an SMS message to a terminal device of a friend by using a terminal device, the SMS message is first sent to a base station, and then the base station sends the SMS message to the terminal device of the friend. In a process in which the terminal device of the user sends the SMS message to the base station, a part of data in the SMS message may be used as primary link data for transmission through a primary communication link, the other part of data, such as audio data in the video, may be used as coordinated link data for transmission through a coordinated communication link. After image data and audio data are received by the base station, data transmission of uplink communication is completed.

Figure 9:
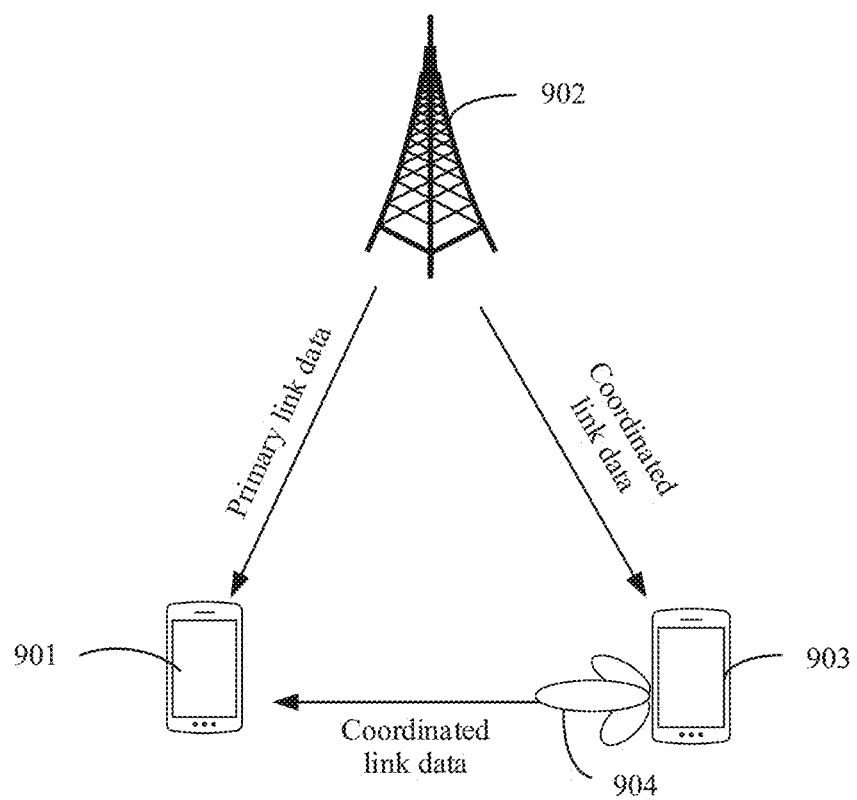
FIG. 9 is a schematic diagram of a structure of downlink communication in a coordinated communication system according to an embodiment of this application.

FIG. 9 is a schematic diagram of a structure of downlink communication in the coordinated communication system in FIG. 1. As shown in FIG. 9, a terminal device 901 receives communication data from a base station 902 through a primary communication link. Step S350 is first described. When the primary communication link is abnormal, the terminal device 901 searches for and determines a coordinated communication device 903. The terminal device 901 receives a direction-finding signal transmitted by the coordinated communication device 903, obtains an angle of departure at which the direction-finding signal leaves the coordinated communication device 903, and sends the angle of departure to the coordinated communication device 903. Then the coordinated communication device 903 directs a beam 904 of an antenna array toward the terminal device 901 based on the angle of departure, to obtain a high antenna gain, and establish a D2D-based virtual MIMO communication connection to the coordinated communication device 903. In step S360, the base station 902 sends coordinated link data to the coordinated communication device 903 based on the D2D virtual MIMO communication connection in step S350, and the coordinated communication device 903 transmits the coordinated link data to the terminal device 901. The primary link data is directly transmitted by the base station to the terminal device through the primary communication link. The terminal device 901 receives the primary link data and the coordinated link data, to complete a data transmission process of downlink communication. For example, in a process in which a user watches a video by using a terminal device, a base station sends the video to the terminal device of the user. Image data in the video may be used as primary link data and transmitted through a primary communication link, and audio data in the video may be used as coordinated link data and transmitted through a coordinated communication link. The terminal device receives the image data and the audio data, to complete data transmission of downlink communication.

In another embodiment of this application, when communication cannot be performed based on the primary communication link, communication data may be transmitted completely through the coordinated communication link, so that communication between the terminal device and the network side device can be implemented, to improve user experience.

In this embodiment of this application, an antenna of another adjacent terminal device may be multiplexed to effectively enhance signal strength received by the terminal device, and improve a network throughput, so that the terminal device has good robustness. In addition, an antenna array is configured based on the angle of arrival and the angle of departure, to quickly implement beamforming. Compared with determining a beamforming direction after 360° scanning in the conventional technology, a delay and power consumption of data transmission performed by the terminal device can be effectively reduced.

Figure 10:
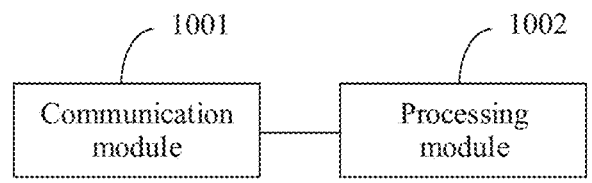
FIG. 10 is a schematic diagram of a structure of a terminal device according to an embodiment of this application.

Based on the foregoing descriptions, the following specifically describes a terminal device in this application. The terminal device is configured to perform the foregoing method embodiments. FIG. 10 is a schematic diagram of a structure of a terminal device. As shown in FIG. 10, the terminal device includes:

a communication module 1001, configured to establish a primary communication link with a network side device, and a processing module 1002, configured to detect one or more other terminal devices, determine, from the one or more other terminal devices, one or more terminal devices as coordinated communication devices, and notify a network side device of information indicating that the coordinated communication device is used for coordinated communication.

The communication module 1001 establishes a D2D-based virtual MIMO communication connection with the coordinated communication device, to form, between the terminal device and the network side device, one or more coordinated communication links relayed by one or more coordinated communication devices.

The processing module 1002 performs parallel communication based on the primary communication link and the coordinated communication link.

According to an embodiment of this application, the processing module 1002 detects that the primary communication link is abnormal, and starts to detect another terminal device.

According to an embodiment of this application, that the terminal device determines that the primary communication link is abnormal includes:

When the terminal device detects that a strength value of a signal received by the terminal device is less than or equal to a preset threshold, the terminal device determines that the primary communication link is abnormal; or when the terminal device detects that a signal-to-noise ratio of a signal received by the terminal device is less than or equal to a preset threshold, the terminal device determines that the primary communication link is abnormal; or when the terminal device detects that a speed of network transmission between the terminal device and the network side device is less than or equal to a preset speed, the terminal device determines that the primary communication link is abnormal.

According to an embodiment of this application, the processing module detects one or more other terminal devices based on a near field communication technology.

According to an embodiment of this application, the processing module measures at least a distance between the processing module and each of the other terminal devices, and selects one or more other terminal devices with a shortest distance or within a preset distance as coordinated communication devices.

According to an embodiment of this application, the processing module measures at least an angle of rotation from a direction that a signal receive end of the processing module faces to a direction toward each of the other terminal devices, and selects one or more other terminal devices with a smallest angle or meeting a preset angle as coordinated communication devices.

According to an embodiment of this application, the processing module obtains signal information of the other terminal devices, where the signal information includes a strength value or a signal-to-noise ratio of a signal received by the other terminal devices, and selects a terminal device whose signal strength value or signal-to-noise ratio value is the largest as a coordinated communication device; or selects one or more other terminal devices whose signal strength values or signal-to-noise ratio values meet a preset value as coordinated communication devices.

According to an embodiment of this application, the processing module measures a distance between the processing module and each of the other terminal devices, measures an angle of rotation from a direction that a signal receive end of the processing module faces to a direction toward each of the other terminal devices, and obtains signal information of the other terminal devices, where the signal information includes a strength value or a signal-to-noise ratio of a signal received by the other terminal devices.

The terminal device determines one or more other terminal devices as coordinated communication devices based on the distance, the angle, and the signal information.

According to an embodiment of this application, the terminal device performs priority sorting on the other terminal devices based on the distance, the angle, and the signal information, and determines one or more other terminal devices as coordinated communication devices.

According to an embodiment of this application, the terminal separately sets weight values for the distance, the angle, and the signal information, performs weighted summation on the distance, the angle, and the signal strength value or performs weighted summation on the distance, the angle, and the signal-to-noise ratio, and then determines one or more other terminal devices with a highest score or meeting a specified value as coordinated communication devices.

According to an embodiment of this application, the processing module receives a user input to designate one or more other terminal devices as coordinated communication devices.

According to an embodiment of this application, the processing module sends communication data to or receives communication data from the network side device based on a communication unit, where the communication data is divided into first data and second data for transmission, the first data is transmitted through the primary communication link, and the second data is transmitted through the coordinated communication link.

According to an embodiment of this application, that the second data is transmitted through the coordinated communication link includes:

The processing module generates and transmits, in a data transmission link over which the communication module receives data from the network side device, a direction-finding signal to the coordinated communication device by using the communication unit, and determines an angle of arrival at which the direction-finding signal arrives at the coordinated communication device;

the communication module sends the angle of arrival to the coordinated communication device, so that the coordinated communication device directs a beam of an antenna array toward the terminal device based on the angle of arrival, and establishes a D2D-based virtual MIMO communication connection to the terminal device; and the communication module receives the second data from the network side device based on the D2D-based virtual MIMO communication connection.

According to an embodiment of this application, that the second data is transmitted through the coordinated communication link includes:

the communication module receives, in a link over which the communication module sends data to the network side device, a transmitted direction-finding signal generated by the coordinated communication device, and the processing module obtains, based on the direction-finding signal, an angle of departure at which the direction-finding signal leaves the coordinated communication device;

the communication module directs a beam of the antenna array toward the coordinated communication device based on the angle of departure, and establishes a D2D-based virtual MIMO communication connection to the coordinated communication device; and the communication module sends the second data to the network side device based on the D2D-based virtual MIMO communication connection.

A specific communication process of each module of the terminal device in this application is described in detail in the foregoing embodiments. For details, refer to the communication method in the foregoing embodiments. Details are not described herein again.

In this embodiment of this application, an antenna of another adjacent terminal device may be multiplexed to effectively enhance signal strength received by the terminal device, and improve a network throughput, so that the terminal device has good robustness. In addition, an antenna array is configured based on the angle of arrival and the angle of departure, to quickly implement beamforming. Compared with determining a beamforming direction after 360° scanning in the conventional technology, a delay and power consumption of data transmission performed by the terminal device can be effectively reduced.

This application further provides a terminal device, including:

a memory, configured to store instructions executed by one or more processors on the device; and the processor, configured to perform the communication method in the foregoing embodiments.

This application further provides a computer-readable storage medium, where the computer-readable storage medium stores a computer program. When the computer program is run by a processor, the processor is enabled to perform the communication method in the foregoing embodiments.

Figure 11:
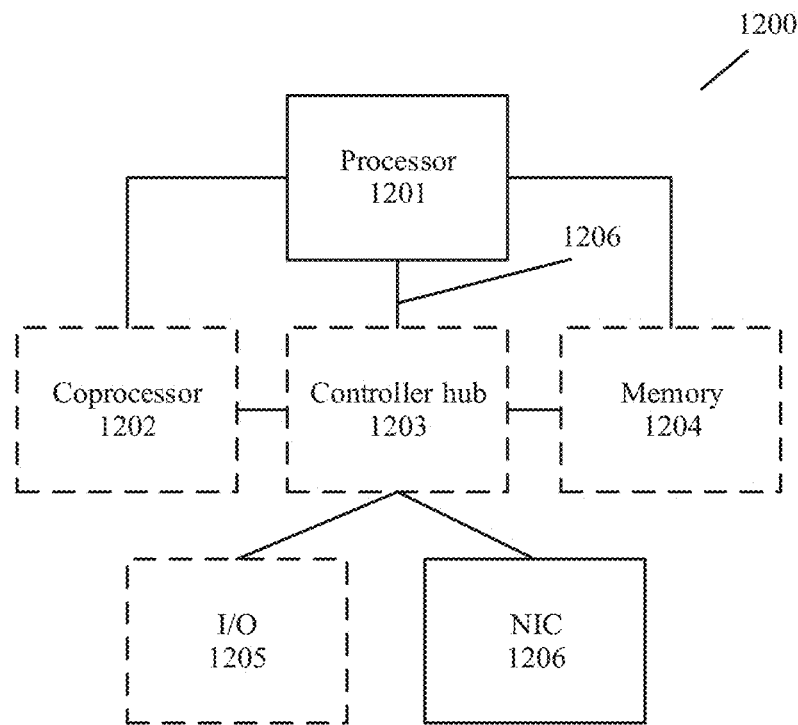
FIG. 11 is a block diagram of a device according to some embodiments of this application.

FIG. 11 shows a block diagram of a device 1200 according to an embodiment of this application. The device 1200 may include one or more processors 1201 coupled to a controller hub 1203. For at least one embodiment, the controller hub 1203 communicates with the processor 1201 by using a multi-branch bus such as a front side bus (Front Side Bus, FSB), a point-to-point interface such as a quick path interconnect (Quick Path Interconnect, QPI), or a similar connection 1206. The processor 1201 executes instructions for controlling a general type of data processing operation. In an embodiment, the controller hub 1203 includes, but is not limited to, a graphics memory controller hub (Graphics Memory Controller Hub, GMCH) (not shown) and an input/output hub (Input/Output Hub, IOH) (which may be on a separate chip) (not shown). The GMCH includes a memory and a graphics controller, and is coupled to the IOH.

The device 1200 may further include a coprocessor 1202 and a memory 1204 that are coupled to the controller hub 1203. Alternatively, one or both of the memory and the GMCH may be integrated into the processor (as described in this application). The memory 1204 and the coprocessor 1202 are directly coupled to the processor 1201 and the controller hub 1203. The controller hub 1203 and the IOH are located in a single chip. The memory 1204 may be, for example, a dynamic random access memory (Dynamic Random Access Memory, DRAM), a phase change memory (Phase Change Memory, PCM), or a combination thereof. In an embodiment, the coprocessor 1202 is an application-specific processor, for example, a high-throughput MIC (Many Integrated Core, MIC) processor, a network or communication processor, a compression engine, a graphics processing unit, a general-purpose graphics processing unit (General Purpose Computing on GPU, GPGPU), or an embedded processor. Optional properties of the coprocessor 1202 are shown in FIG. 11 in dashed lines.

As a computer-readable storage medium, the memory 1204 may include one or more tangible non-transitory computer-readable media that are configured to store data and/or instructions. For example, the memory 1204 may include any suitable nonvolatile memory such as a flash memory and/or any suitable nonvolatile storage device, for example, one or more hard-disk drives (Hard-Disk Drive, HDD (s)), one or more compact disc (Compact Disc, CD) drives, and/or one or more digital versatile disc (Digital Versatile Disc, DVD) drives.

In an embodiment, the device 1200 may further include a network interface controller (Network Interface Controller, NIC) 1206. The network interface controller 1206 may include a transceiver, configured to provide a radio interface for the device 1200, to communicate with any another suitable device (such as a front-end module or an antenna). In various embodiments, the network interface controller 1206 may be integrated with another component of the device 1200. The network interface controller 1206 may implement a function of a communication unit in the foregoing embodiments.

The device 1200 may further include an input/output (Input/Output, I/O) device 1205. The I/O 1205 may include: a user interface, designed to enable a user to interact with the device 1200; a peripheral component interface, designed to enable a peripheral component to interact with the device 1200; and/or a sensor, designed to determine an environmental condition and/or location information related to the device 1200.

It should be noted that FIG. 11 is merely an example. In other words, although FIG. 11 shows that the device 1200 includes a plurality of components such as the processor 1201, the controller hub 1203, and the memory 1204, in actual application, a device that uses the methods in this application may only include some of the components of the device 1200, for example, may only include the processor 1201 and the NIC 1206. In FIG. 11, properties of the optional components are shown by using dashed lines.

According to some embodiments of this application, the memory 1204 that is used as a computer-readable storage medium stores instructions. When the instructions are executed on a computer, the system 1200 is enabled to perform the calculation method in the foregoing embodiments. For details, refer to the method in the foregoing embodiments. Details are not described herein again.

Figure 12:
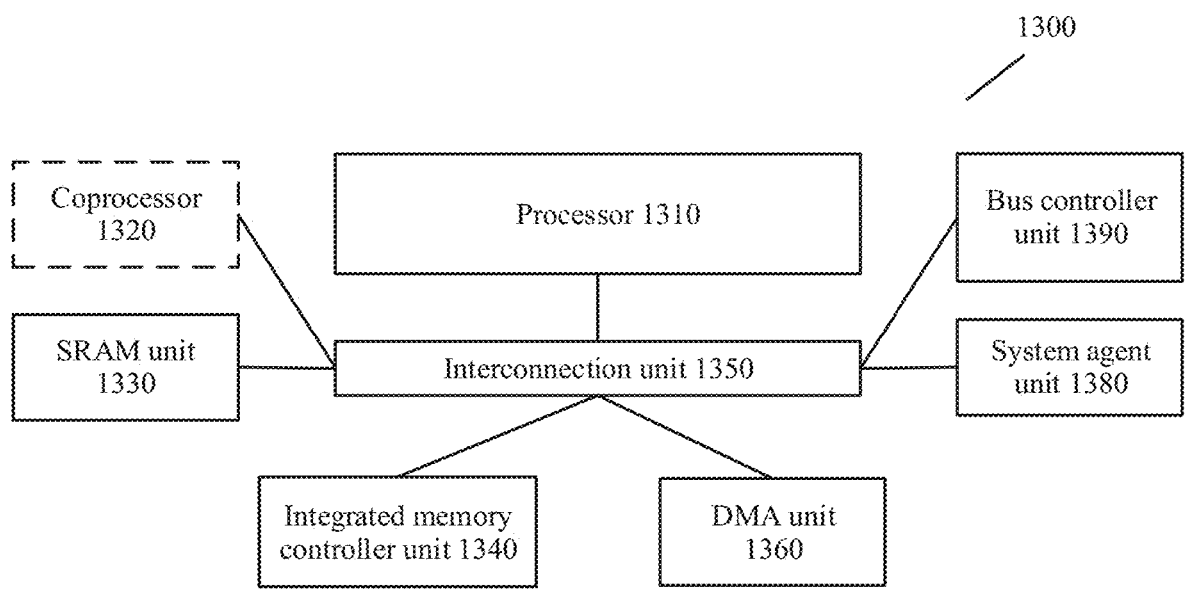
FIG. 12 is a block diagram of a system on chip (SoC) according to some embodiments of this application.

FIG. 12 shows a block diagram of a SoC (System-on-a-Chip, System-on-a-Chip) 1300 according to an embodiment of this application. In FIG. 12, similar parts have a same reference numeral. In addition, a dashed box is an optional feature of a more advanced SoC. In FIG. 12, the SoC 1300 includes: an interconnection unit 1350, coupled to an application processor 1310; a system agent unit 1380; a bus controller unit 1390; an integrated memory controller unit 1340; one group of coprocessors 1320 or one or more coprocessors 1320, that may include integrated graphics logic, an image processor, an audio processor, and a video processor; a static random access memory (Static Random Access Memory, SRAM) unit 1330; and a direct memory access (DMA) unit 1360. In an embodiment, the coprocessor 1320 includes an application-specific processor, for example, a network or communication processor, a compression engine, a GPGPU, a high-throughput MIC processor, or an embedded processor.

The static random access memory (SRAM) unit 1330 may include one or more computer-readable media for storing data and/or instructions. The computer-readable storage medium may store instructions, and specifically, store temporary and permanent copies of the instructions. The instructions may include: enabling the SoC 1300 to perform the calculation method in the foregoing embodiment when being executed by at least one unit in the processor. For details, refer to the method in the foregoing embodiments, and details are not described herein again.

Embodiments of mechanisms disclosed in this application may be implemented in hardware, software, firmware, or a combination of these implementation methods. Embodiments of this application may be implemented as a computer program or program code that is executed on a programmable system, and the programmable system includes at least one processor, a storage system (including volatile and nonvolatile memory and/or a storage element), at least one input device, and at least one output device.

The program code may be used to input instructions, to perform functions described in this application and generate output information. The output information may be applied to one or more output devices in a known manner. For a purpose of this application, a processing system includes any system that has a processor such as a digital signal processor (Digital Signal Processor, DSP), a microcontroller, an application-specific integrated circuit (Application-Specific Integrated Circuit, ASIC), or a microprocessor.

The program code may be implemented in a high-level procedural language or an object-oriented programming language, to communicate with the processing system. The program code may also be implemented by using an assembly language or a machine language when needed. Actually, the mechanism described in this application is not limited to a scope of any particular programming language. In any case, the language may be a compiled language or an interpretive language.

In some cases, the disclosed embodiments may be implemented by using hardware, firmware, software, or any combination thereof. The disclosed embodiments may be alternatively implemented as instructions carried by or stored on one or more temporary or non-temporary machine-readable (for example, computer-readable) storage media, and the instructions may be read and executed by one or more processors. For example, the instructions may be distributed through a network or another computer-readable medium. Therefore, the machine-readable medium may include any mechanism for storing or transmitting information in a machine (for example, a computer)-readable form.

The machine-readable medium includes but is not limited to a floppy disk, an compact disc, an optical disc, a compact disc read-only memory (Compact Disc Read-Only Memory, CD-ROMs), a magneto-optical disc, a read-only memory (Read-Only Memory, ROM), a random access memory (RAM), an erasable programmable read-only memory (Erasable Programmable Read-Only Memory, EPROM), an electrically erasable programmable read-only memory (Electrically Erasable Programmable Read-Only Memory, EEPROM), a magnetic card or an optical card, a flash memory, or a tangible machine-readable memory that is configured to transmit information through the Internet by using electricity, light, sound or another form of propagating signal (for example, carrier, an infrared signal, or a digital signal). Therefore, the machine-readable medium includes any type of machine-readable medium that is suitable for storing or transmitting electronic instructions or information in a machine (for example, a computer)-readable form.

In the accompanying drawings, some structural or method features may be shown in a particular arrangement and/or order. However, it should be understood that such a particular arrangement and/or order may not be required. In some embodiments, these features may be arranged in a manner and/or order different from that shown in the accompanying drawings of the specification. In addition, inclusion of the structural or method features in a particular figure does not imply that such features are required in all embodiments, and in some embodiments, these features may not be included or may be combined with other features.

It should be noted that all units/modules mentioned in the device embodiments of this application are logical units/modules. Physically, one logical unit/module may be one physical unit/module, or may be a part of one physical unit/module, or may be implemented by a combination of a plurality of physical units/modules. Physical implementations of these logical units/modules are not the most important, and a combination of functions implemented by these logical units/modules is a key to resolving technical problems proposed in this application. In addition, to highlight an innovative part of this application, a unit/module that is not closely related to resolving the technical problems proposed in this application is not introduced in the foregoing device embodiments of this application. This does not indicate that there is not another unit/module in the foregoing device embodiments.

It should be noted that, in examples and the specification of this patent, relational terms such as first and second are only used to distinguish one entity or operation from another entity or operation, and do not necessarily require or imply that any actual relationship or sequence exists between these entities or operations. Moreover, the term "include", "contain", or any other variant thereof is intended to cover a non-exclusive inclusion, so that a process, a method, an article, or a device that includes a series of elements not only includes those elements, but also includes another element that is not explicitly listed, or also includes an element that is inherent to the process, the method, the article, or the device. An element preceded by "includes a . . . " does not, without more constraints, preclude the presence of additional identical elements in the process, method, article, or device that includes the element.

Although this application is illustrated and described with reference to some preferred embodiments of the present invention, a person of ordinary skill in the art should understand that various changes may be made to the form and details in this application without departing from the spirit and scope of this application.

What is claimed is:

1. A method, wherein the method comprises:
   establishing, by a terminal device, a primary communication link with a network side device;
   detecting, by the terminal device, one or more other terminal devices;
   determining, by the terminal device from the one or more other terminal devices, one or more terminal devices as one or more coordinated communication devices, wherein the determining one or more terminal devices as one or more coordinated communication devices comprises:
      measuring a distance between the terminal device and each of the one or more other terminal devices;
      measuring an angle of rotation from a direction that a signal receive end of the terminal device faces to a direction toward each of the one or more other terminal devices, and
      obtaining signal information of each of the one or more other terminal devices, wherein the signal information comprises a signal strength value or a signal-to-noise ratio of a signal received by the each of the one or more other terminal devices; and
      determining the one or more terminal devices as the one or more coordinated communication devices based on the distance, the angle, and the signal information;
   notifying, by the terminal device, the network side device of information indicating that a coordinated communication device is used for coordinated communication;
   establishing, by the terminal device, a device-to-device (D2D)-based virtual multiple-input multiple-output (MIMO) communication connection with the coordinated communication device, to form, between the terminal device and the network side device, a coordinated communication link relayed by the coordinated communication device; and
   performing, by the terminal device, parallel communication with the network side device based on the primary communication link and the coordinated communication link, or performing communication based on the coordinated communication link.

2. The method according to claim 1, wherein the detecting, by the terminal device, one or more other terminal devices comprises:
   detecting, by the terminal device, that the primary communication link is abnormal; and
   starting to detect another terminal device.

3. The method according to claim 2, wherein the detecting, by the terminal device, that the primary communication link is abnormal comprises:
   in response to detecting that a strength value of a signal received by the terminal device is less than or equal to a preset threshold, determining, by the terminal device, that the primary communication link is abnormal; or
   in response to detecting that a signal-to-noise ratio of a signal received by the terminal device is less than or equal to a preset threshold, determining, by the terminal device, that the primary communication link is abnormal; or
   in response to detecting that a speed of network transmission between the terminal device and the network side device is less than or equal to a preset speed, determining, by the terminal device, that the primary communication link is abnormal.

4. The method according to claim 1, wherein
   the terminal device detects the one or more other terminal devices based on a short-distance measurement technology.

5. The method according to claim 4, wherein the determining one or more terminal devices as coordinated communication devices comprises:
   selecting, by the terminal device, one or more other terminal devices with a shortest distance or within a preset distance as the one or more coordinated communication devices.

6. The method according to claim 4, wherein the determining one or more terminal devices as coordinated communication devices comprises:
   selecting, by the terminal device, one or more other terminal devices with a smallest angle or meeting a preset angle as the one or more coordinated communication devices.

7. The method according to claim 4, wherein the determining one or more terminal devices as coordinated communication devices comprises:
   selecting, by the terminal device, a terminal device whose signal strength value or signal-to-noise ratio value is the largest as the coordinated communication device; or
   selecting, by the terminal device, one or more other terminal devices whose signal strength values or signal-to-noise ratio values meet a preset value as the one or more coordinated communication devices.

8. The method according to claim 1, wherein the terminal device performs priority sorting on the one or more other terminal devices based on the distance, the angle, and the signal information, and determines the one or more terminal devices as the one or more coordinated communication devices.

9. The method according to claim 1, wherein the terminal device sets weight values for the distance, the angle, and the signal information, performs weighted summation on the distance, the angle, and the signal strength value or performs weighted summation on the distance, the angle, and the signal-to-noise ratio, and determines the one or more terminal devices with a highest score or meeting a specified value as the one or more coordinated communication devices.

10. The method according to claim 1, wherein the method further comprises:
    detecting, by the terminal device, the one or more other terminal devices; and
    displaying, by the terminal device, the one or more other terminal devices.

11. The method according to claim 10, wherein the determining one or more terminal devices as coordinated communication devices comprises:
    receiving, by the terminal device, a user input to designate the one or more terminal devices as the one or more coordinated communication devices.

12. The method according to claim 1, wherein the terminal device sends communication data to or receives communication data from the network side device, wherein the communication data is divided into first data and second data for transmission, the first data is transmitted through the primary communication link, and the second data is transmitted through the coordinated communication link.

13. The method according to claim 12, wherein that the second data is transmitted through the coordinated communication link comprises:
    receiving, by the terminal device in a transmission link over which the terminal device receives data from the network side device, a direction-finding signal generated by the coordinated communication device; and determining, by the terminal device, an angle of arrival when the direction-finding signal arrives at the terminal device;

sending, by the terminal device, the angle of arrival to the coordinated communication device, so that the coordinated communication device directs a beam of an antenna array toward the terminal device based on the angle of arrival and establishes a D2D-based virtual MIMO communication connection to the terminal device; and receiving, by the terminal device, the second data from the network side device through the D2D-based virtual MIMO communication connection.

14. The method according to claim 12, wherein that the second data is transmitted through the coordinated communication link comprises:

receiving, by the terminal device in a link over which the terminal device sends data to the network side device, a direction-finding signal generated by the coordinated communication device, and obtaining, based on the direction-finding signal, an angle of departure when the direction-finding signal leaves the coordinated communication device;

directing, by the terminal device, a beam of an antenna array toward the coordinated communication device based on the angle of departure, and establishing a device-to-device-based virtual multiple-input multiple-output communication connection to the coordinated communication device; and sending, by the terminal device, the second data to the network side device through the device-to-device-based virtual multiple-input multiple-output communication connection.

15. A communication system, comprising a terminal device, a network side device, and a coordinated communication device, wherein the terminal device is configured to:

establish a primary communication link with the network side device;

detect one or more other terminal devices;

determine, from the one or more other terminal devices, one or more terminal devices as one or more coordinated communication devices, wherein the one or more coordinated communication devices are determined by operations comprising:

measuring a distance between the terminal device and each of the one or more other terminal devices;

measuring an angle of rotation from a direction that a signal receive end of the terminal device faces to a direction toward each of the one or more other terminal devices, obtaining signal information of each of the one or more other terminal devices, wherein the signal information comprises a signal strength value or a signal-to-noise ratio of a signal received by the each of the one or more other terminal devices; and determining the one or more terminal devices as the one or more coordinated communication devices based on the distance, the angle, and the signal information;

notify the network side device of information indicating that a coordinated communication device is used for coordinated communication;

establish a device-to-device (D2D)-based virtual multiple-input multiple-output communication (MIMO) connection with the coordinated communication device, to form, between the terminal device and the network side device, a coordinated communication link relayed by the coordinated communication device; and perform parallel communication with the network side device based on the primary communication link and the coordinated communication link, or perform communication based on the coordinated communication link.

16. A terminal device, comprising:

at least one processor; and at least one memory coupled to the at least one processor and storing instructions for execution by the at least one processor that enable the terminal device to perform operations comprising:

establishing a primary communication link with a network side device;

detecting one or more other terminal devices;

determining, from the one or more other terminal devices, one or more terminal devices as one or more coordinated communication devices, wherein the determining one or more terminal devices as one or more coordinated communication devices comprises:

measuring a distance between the terminal device and each of the one or more other terminal devices;

measuring an angle of rotation from a direction that a signal receive end of the terminal device faces to a direction toward each of the one or more other terminal devices, obtaining signal information of each of the one or more other terminal devices, wherein the signal information comprises a signal strength value or a signal-to-noise ratio of a signal received by the each of the one or more other terminal devices; and determining the one or more terminal devices as the one or more coordinated communication devices based on the distance, the angle, and the signal information;

notifying the network side device of information indicating that a coordinated communication device is used for coordinated communication;

establishing a device-to-device (D2D)-based virtual multiple-input multiple-output (MIMO) communication connection with the coordinated communication device, to form, between the terminal device and the network side device, a coordinated communication link relayed by the coordinated communication device; and performing parallel communication with the network side device based on the primary communication link and the coordinated communication link, or performing communication based on the coordinated communication link.

17. The terminal device according to claim 16, wherein the operations further comprise:

detecting that the primary communication link is abnormal; and starting to detect another terminal device.

18. The terminal device according to claim 16, wherein the determining one or more terminal devices as coordinated communication devices comprises:

selecting a terminal device whose signal strength value or signal-to-noise ratio value is the largest as the coordinated communication device; or selecting one or more other terminal devices whose signal strength values or signal-to-noise ratio values meet a preset value as the one or more coordinated communication devices.

19. The terminal device according to claim 16, wherein the determining one or more terminal devices as coordinated communication devices comprises:

receiving a user input to designate the one or more terminal devices as the one or more coordinated communication devices.

20. The terminal device according to claim 16, wherein the operations further comprise:
    detecting the one or more other terminal devices; and
    displaying the one or more other terminal devices.

\* \* \* \* \*